(12) United States Patent
Phillips

(10) Patent No.: US 7,997,498 B2
(45) Date of Patent: Aug. 16, 2011

(54) IDENTIFICATION OF INSTALLABLE CARD

(75) Inventor: Simon Phillips, York (GB)

(73) Assignee: Mastercard International, Inc., Purchase, NY (US)

( * ) Notice: Subject to any disclaimer, the term of this patent is extended or adjusted under 35 U.S.C. 154(b) by 1009 days.

(21) Appl. No.: 11/852,751

(22) Filed: Sep. 10, 2007

(65) Prior Publication Data

US 2008/0061151 A1  Mar. 13, 2008

Related U.S. Application Data

(60) Provisional application No. 60/843,045, filed on Sep. 8, 2006.

(51) Int. Cl.
*G06K 19/06* (2006.01)
(52) U.S. Cl. ....................................................... 235/492
(58) Field of Classification Search .................... 235/492
See application file for complete search history.

(56) References Cited

U.S. PATENT DOCUMENTS

| | | | |
|---|---|---|---|
| 5,276,311 A | | 1/1994 | Hennige |
| 5,585,787 A | | 12/1996 | Wallerstein |
| 5,955,961 A | | 9/1999 | Wallerstein |
| 6,224,254 B1 * | | 5/2001 | Hayek et al. .................. 368/281 |
| 6,315,195 B1 | | 11/2001 | Ramachandran |
| 6,353,811 B1 | | 3/2002 | Weissman |
| 6,561,432 B1 | | 5/2003 | Vedder et al. |
| 6,631,849 B2 | | 10/2003 | Blossom |

(Continued)

FOREIGN PATENT DOCUMENTS

WO     98/33193 A1     7/1998

(Continued)

OTHER PUBLICATIONS

International Standard, "Identification cards—Physical Characteristics", ISO/IEC 7810, Third Edition, Nov. 1, 2003, 18pgs.

(Continued)

*Primary Examiner* — Seung Lee
(74) *Attorney, Agent, or Firm* — Buckley, Maschoff & Talwalkar LLC

(57) ABSTRACT

In accordance with some embodiments, a method includes providing an integrated circuit (IC) card having a first size and carried as part of a surrounding card having a second size larger than the first size, the IC card including an IC, the IC card having a perimeter defining the IC card within the surrounding card; and printing a payment card account number within the perimeter. In accordance with some embodiments, an identification token includes a carrier having a body; a card including an RFID integrated circuit and information printed within a perimeter of the card; a bridge joining the card to the carrier; an antenna; and an electrically conductive connection running along the bridge, the electrically conductive connection coupling the RFID IC to the antenna. In accordance with some embodiments, a method includes providing a carrier having a body; providing a card including an RFID integrated circuit and a perimeter; providing a bridge joining the card to the carrier; providing an antenna and an electrically conductive connection running along the bridge, the electrically conductive connection coupling the RFID IC to the antenna; and printing information within the perimeter. In accordance with some embodiments, a method includes providing an integrated circuit (IC) card attached to a surrounding card, the IC card including an IC, the IC card having a perimeter defining the IC card within the surrounding card; and printing information within the perimeter.

6 Claims, 22 Drawing Sheets

U.S. PATENT DOCUMENTS

| | | | |
|---|---|---|---|
| 6,685,097 B1 * | 2/2004 | Housse | 235/492 |
| 6,715,679 B1 | 4/2004 | Infosino | |
| 6,764,005 B2 | 7/2004 | Cooper | |
| 6,766,952 B2 | 7/2004 | Luu | |
| 6,863,220 B2 | 3/2005 | Selker | |
| 6,978,940 B2 * | 12/2005 | Luu | 235/486 |
| 7,012,504 B2 | 3/2006 | Tuttle | |
| D522,052 S * | 5/2006 | Lubking | D19/10 |
| 7,143,419 B2 | 11/2006 | Fischer et al. | |
| 7,204,412 B2 | 4/2007 | Foss, Jr. | |
| 7,264,172 B2 | 9/2007 | Amiot et al. | |
| 7,341,198 B2 * | 3/2008 | Nishizawa et al. | 235/492 |
| 2003/0132301 A1 | 7/2003 | Selker | |
| 2004/0124248 A1 | 7/2004 | Selker | |
| 2004/0223305 A1 | 11/2004 | Amoit et al. | |
| 2005/0258245 A1 | 11/2005 | Bates et al. | |
| 2006/0137464 A1 | 6/2006 | Baudendistel | |
| 2008/0011859 A1 | 1/2008 | Phillips | |
| 2008/0035740 A1 | 2/2008 | Tanner | |
| 2008/0054078 A1 | 3/2008 | Tanner | |
| 2008/0061148 A1 | 3/2008 | Tanner | |
| 2008/0061149 A1 | 3/2008 | Tanner | |
| 2008/0061150 A1 | 3/2008 | Phillips | |
| 2008/0121707 A1 | 5/2008 | Phillips et al. | |
| 2008/0165006 A1 | 7/2008 | Phillips | |
| 2009/0065575 A1 | 3/2009 | Phillips et al. | |
| 2009/0065587 A1 | 3/2009 | Phillips | |
| 2009/0100511 A1 | 4/2009 | Phillips et al. | |

FOREIGN PATENT DOCUMENTS

| | | |
|---|---|---|
| WO | 99/38173 A1 | 7/1999 |
| WO | 00/79546 A1 | 12/2000 |

OTHER PUBLICATIONS

"The Design of a Smart Card Interface Device: Chapter 5—Smart Card Protocols and ISO 7816-4", Retrieved Feb. 22, 2007. Retrieved from URL: http://www.cs.uct.ac.za/Research/DNA/SOCS/rchap5.html, 10pgs.

Jay MacDonald, "Calling Dick Tracy: Credit card watches debut", Mar. 24, 2009, Credit Cards.com, 2pgs.

Leslie Berlin, "Cellphones as Credits? Americans Must Wait", Jan. 24, 2009, The New York Times, [Retrieved Jan. 26, 2009]. Retrieved from URL: http://www.nytimes.com/2009/01/25/business/25proto.html?_r=1&em, 3pgs.

"Speedpass and Timex offer payments-by-wristwatch", Dec. 10, 2002, [Retrieved Mar. 31, 2009]. Retrieved from URL: http://www.finextra.com/fullstory.asp?id=7530, 2pgs.

"JCB pilots contactless payments", Apr. 1, 2004, [Retrieved Mar. 31, 2009]. Retrieved from URL: http://www.finextra.com/fullstory.asp?id=11549, 2pgs.

JCB delivers contactless Offica service over Casio wrist watch, Jun. 14, 2004, [Retrieved Mar. 31, 2009]. Retrieved from URL: http://www.finextra.com/fullstory.asp?id=11994, 2pgs.

"MasterCard launches OneSmart Paypass", Nov. 2, 2004, [Retrieved Mar. 31, 2009]. Retrieved from URL: http://www.finextra.com/fullstory.asp?id=12788, 2pgs.

"Visa launches contactless payments system in US", Feb. 25, 2005, [Retrieved Mar. 31, 2009]. Retrieved from URL: http://www.finextra.com/fullstory.asp?id=13291, 2pgs.

"Contact sports fans go contactless with MasterCard PayPass", Feb. 22, 2005, [Retrieved Mar. 31, 2009]. Retrieved from URL: http://www.finextra.com/fullstory.asp?id=13291, 2pgs.

Ian Rowley (in Tokyo), "$5,000? Put It On My Cell", Jun. 6, 2005, Asian Business, Business Week, [Retrieved Mar. 31, 2009]. Retrieved from URL: http://www.businessweek.com/print/magazine/content/05_23/b3936060.htm?chan=gl, 2pgs.

"Citibank to roll out MasterCard PayPass contactless keyring", Aug. 25, 2005, [Retrieved Mar. 31, 2009]. Retrieved from URL: http://www.finextra.com/fullstory.asp?id=14154, 2pgs.

Michael Fitzgerald, "Use your Cell Phone Instead of Your Credit Card", Monday, Sep. 19, 2005, PC World Communications, Inc., 2ps.

"Chinatrust releases PayPass-enabled wrist watch", Jun. 7, 2006, [Retrieved Mar. 31, 2009]. Retrieved from URL: http://www.finextra.com/fullstory.asp?id=15406, 2pgs.

"Turkey's Garanti Bank to issue PayPass wrist watch", May 8, 2007, [Retrieved Mar. 31, 2009]. Retrieved from URL: http://www.finextra.com/fullstory.asp?id=16902, 2pgs.

"Turkey gets wristwatch with built-in credit card", May 11, 2007, [Retrieved Mar. 30, 2009]. Retrieved from URL: http://www.wristdreams.com/archives/2007/05/turkey_gets_wri.html, 4pgs.

"Wristwatch Equipped With A Built-In Credit Card", Thursday, May 17, 2007, [Retrieved Mar. 30, 2009]. Retrieved from URL: http://www.crookedbrains.net/2007/05/wristwatch-equipped-with-built-in.html, 4pgs.

"Wristwatch With Built-In Credit Card", Saturday, May 26, 2007, [Retrieved Mar. 30, 2009]. Retrieved from URL: http://www.funniestgadgets.com/2007/05/26/wristwatch-with-built-in-credit-card/, 3pgs.

Karen Bruno, "Artist peddling designs for your credit card", Aug. 8, 2007, [Retrieved Mar. 31, 2009]. Retrieved from URL: http://www.creditcards.com/credit-card-news/credit-card-designs-and-covers-1273.php, 3pgs.

"Credit Card Rings (1964)", Thursday, Sep. 13, 2007, Paleo-Future, [Retrieved Mar. 30, 2009]. Retrieved from URL: http://www.paleofuture.com/blog/2007/9/14/credit-card-rings-1964.html, 5pgs.

"Altair unveils pre-paid contactless PayPass wrist watch", Jun. 27, 2008, [Retrieved Mar. 31, 2009]. Retrieved from URL: http://www.finextra.com/fullstory.asp?id=18654, 3pgs.

* cited by examiner

IDENTIFICATION OF INSTALLABLE CARD

CROSS REFERENCE TO RELATED APPLICATION

This application claims priority under 35 U.S.C. §119 to U.S. Provisional Patent Application Ser. No. 60/843,045, entitled "IMPROVED IDENTIFICATION OF INSTALLABLE RFID IC PAYMENT CARD", filed in the name of Simon Phillips on Sep. 8, 2006, the contents of which are hereby incorporated by reference.

BACKGROUND

Proximity payment cards are in widespread use. A well known standard for such cards has been promulgated by MasterCard International Incorporated, the assignee hereof, and is referred to as "PayPass". Proximity payment cards typically include a radio frequency identification (RFID) integrated circuit (IC) embedded in a card-shaped plastic body. An antenna is also embedded in the card body. The antenna allows the card to receive a power signal from a point of sale terminal. The antenna is also used by the RFID IC to transmit the payment card account number, and possibly other information as well, to the POS terminal.

It has been proposed to provide an RFID IC card that is installable in a wristwatch or other device so that such device may function as a proximity payment device.

DETAILED DESCRIPTION

Figure 1:
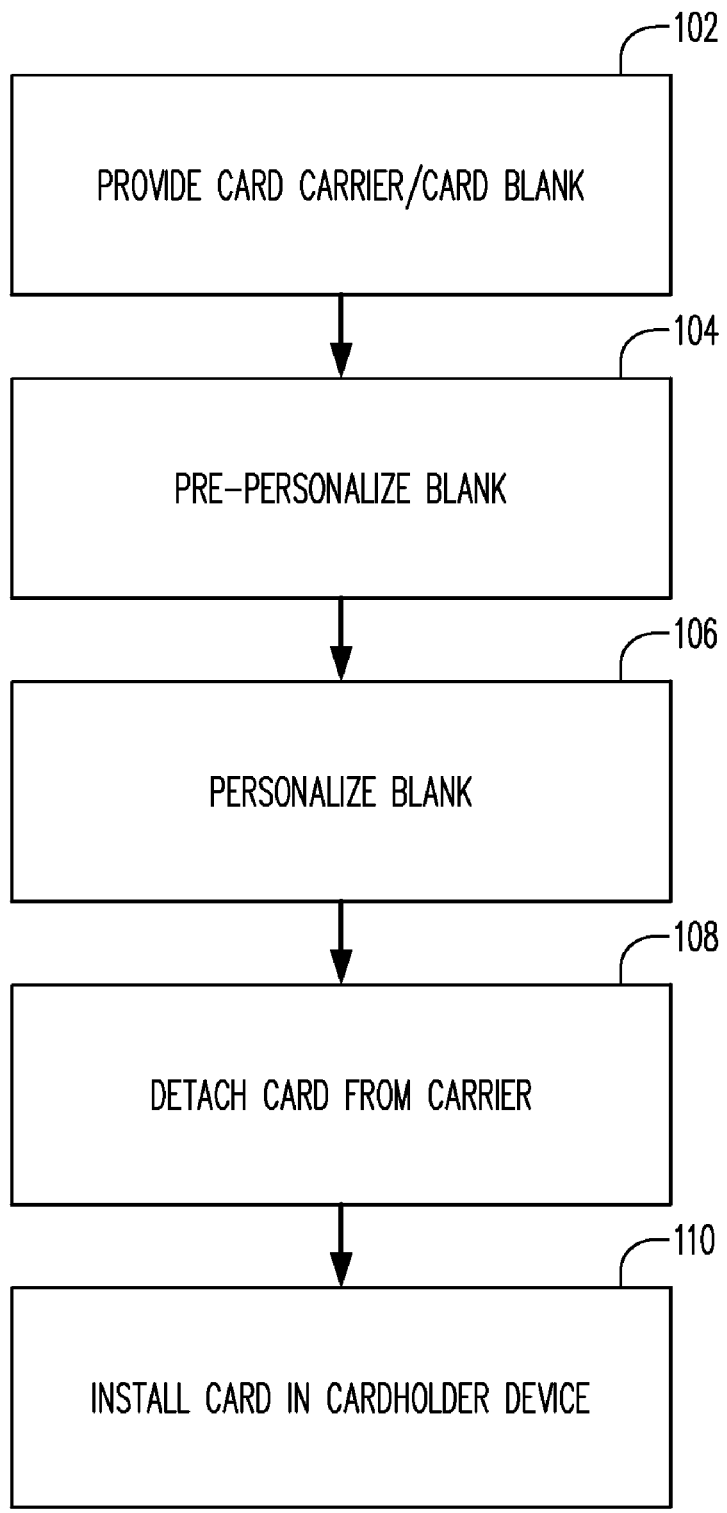
FIG. 1 is a flow chart that illustrates a process for making a proximity payment device according to some embodiments.

FIG. 1 is a flow chart that illustrates a process for making a proximity payment device according to some embodiments.

Figure 2A:
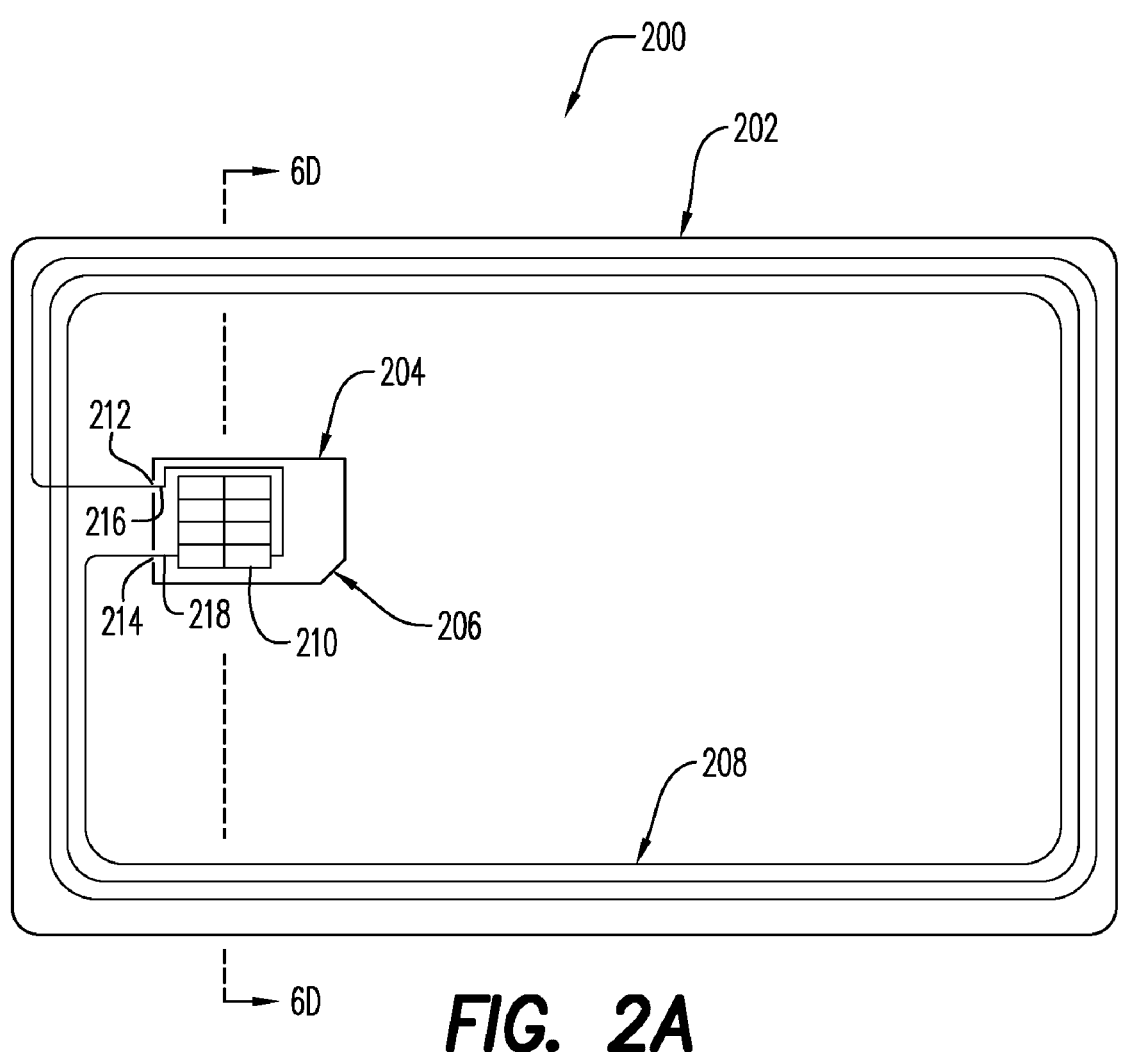
FIG. 2A is a plan view of a structure that includes a small IC card blank and a larger carrier for the small IC card blank, in accordance with some embodiments.

At 102, a card carrier and associated small IC card blank are provided. In some embodiments, the card carrier and small IC card blank may be similar to known constructions. FIG. 2A is a plan view of a structure 200, according to some embodiments, which includes a card carrier indicated by reference numeral 202 and a small IC card blank indicated by reference numeral 204. The carrier 202 may be generally card-shaped and may have dimensions as defined for the standard card referred to as "ID1" in ISO/IEC standard 7810, promulgated by the International Standardization Organization and other bodies. The small IC card 204 may have dimensions as defined for the standard card/module referred to as "ID000" in the same document no. 7810. The small IC card 204 may be substantially defined within the body of the carrier 202 by substantial or nearly complete punching or scoring of the body of the carrier 202, which punching or scoring is indicated at 206. The carrier 202 includes an antenna 208 embedded therein. The antenna 208 may take the form of several loops that run along the periphery of the carrier 202, as shown in FIG. 2A.

The small IC card 204 includes an IC indicated at 210, on which several contact pads (not separately assigned numerals in FIG. 2A) are formed.

The carrier 202 constitutes a "surrounding card" that surrounds and carries the small IC card blank 204.

In some embodiments, the body of the small IC card 204 may be joined to the body of the carrier 202 by, and only by, a few bridges at the periphery of the body of the small IC card 204. Two such bridges are shown, at 212 and 214, although others may be present. The bridges may be formed as locations around the periphery of the small IC card 204 at which the scoring or punching has not occurred.

The IC 210 of the small IC card 204 may be electrically conductively coupled to the antenna by electrically conductive connections 216, 218 which respectively run along the bridges 212, 214. In other words, the electrically conductive connections 216, 218 may be at least partially embedded in the bridges 212, 214, respectively.

At 104 in FIG. 1, a process step customarily referred to as "pre-personalization" is performed with respect to the small IC card 204. As is familiar to those who are skilled in the art, pre-personalization entails writing into the IC 210, via radio frequency communication (received by the IC 210 via the antenna 208), certain information such as loading of keys to be used in subsequent transactions and setting of parameters (such as to select a particular card brand to be borne by the small IC card 204). In addition, information such as a payment card association brand, etc., may be printed on the small IC card 204 as part of the pre-personalization process. It will be appreciated that the information stored in the IC 210 and/or printed on the small IC card 204 may be such as is common to all small IC cards processed in a particular production run.

At 106 in FIG. 1, a process step customarily referred to as "personalization" is performed with respect to the small IC card 204. In the personalization step, the small IC card 204 is effectively assigned to a particular payment card account and/or a particular account holder by writing into the IC 210 (again via radio frequency communication through the antenna 208) information such as a payment card account number and the name of the account holder. Other information, such as expiration date, may be stored in either of the pre-personalization and personalization steps. Moreover, the pre-personalization and personalization steps may be combined in one operation. Such an operation (or operations, if the steps are performed separately) may be performed by use of an item of conventional contactless card programming equipment, such as the model 9000 available from Datacard Group, Minnetonka, Minn.

Figure 3A:
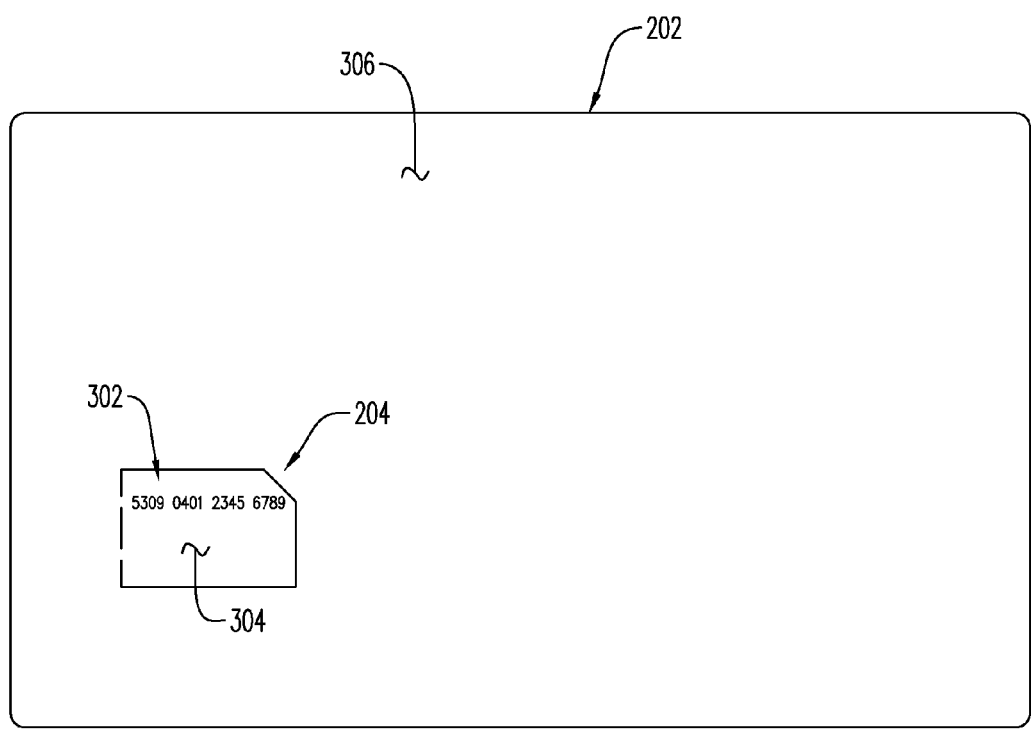
FIG. 3A is a schematic rotated bottom plan view of the carrier and small IC card after a printing operation has been performed on the small IC card in accordance with an aspect of the invention.

In accordance with some embodiments, and as a part of the personalization step, information, which may include but is not limited to, one or more portions of the payment card account number that was (or is to be) stored in the IC 210 may be printed on a surface of the small IC card 204. The printing of the one or more portions of the payment card account number on the small IC card 204 may be by use of the above-mentioned Datacard 9000 equipment or by another suitable device with printing capabilities. FIG. 3A is a schematic rotated bottom plan view of the carrier 202 and small IC card 204 after the operation of printing the payment card account number has been performed on the small IC card 204. An example of the printed payment card account number is indicated at 302 in FIG. 3A. The printed payment card account number 302 is on the bottom surface 304 of the small IC card 204. The bottom surface 304 of the small IC card 204 is surrounded by the bottom surface 306 of the carrier 202. The payment card account is printed within a perimeter of the small IC card 204 which defines the small IC card 204 within the surrounding carrier 202.

Figure 3B:
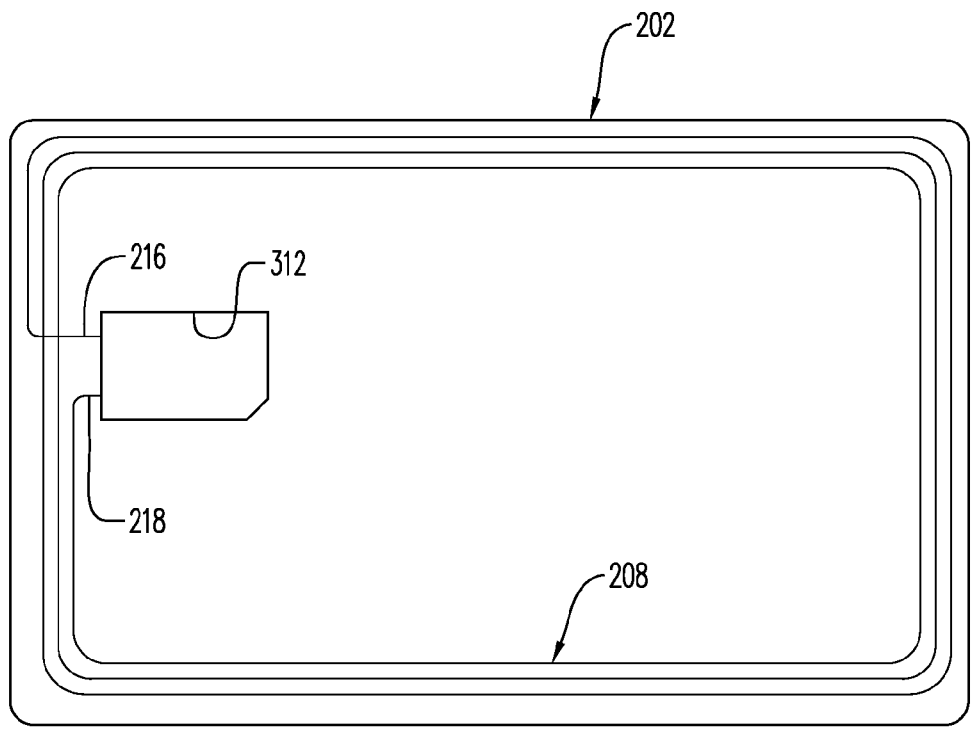
FIG. 3B is a view similar to FIG. 2A of the carrier after the small IC card has been removed therefrom.

FIG. 3B shows an example of a small IC card with only a portion of the payment card account number, indicated at 302, printed thereon. In some embodiments, the portion of the payment card account number 302 may include six digits at the beginning of the account number and/or six digits at the end of the account number. If the payment card account number has a BIN portion, the six digits at the beginning of the account number may correspond to such BIN portion. However, in some embodiments, the portion of the payment card account number may include any number of characters disposed at any position(s) of the account number.

In some embodiments, a placeholder may be provided in place of any portion of portions of the payment card account number that are not printed. In some embodiments, one or more X's, (and/or other character(s)) and/or one or more blank spaces may be used as a placeholder for any portions of the payment card account number that are not printed. In some embodiments, an X may be printed in place of each omitted character of the payment card account number.

In some embodiments, the printed information may include one, some or all portions of a name, an expiration date and/or a security code associated with the payment card account number.

One or more surfaces of the small IC card 204 may carry one or more logos and/or brands, including for example the brand/logo of a national payment card association such as MasterCard International Incorporated. The brand/logo of the issuer may also be present, as well as, for example, a specific card product brand. Other features that may be present on the small IC card 204 (though such features are not shown) are an adhesive paper strip to receive the signature of the cardholder, and a security code or the like printed on the adhesive strip.

In accordance with some embodiments, the structure 200 may thereafter be used as a proximity payment device. As further described hereinafter, the small IC card 204 may also be detached from the carrier 202 and installed in one or more other proximity payment devices.

Figure 2B:
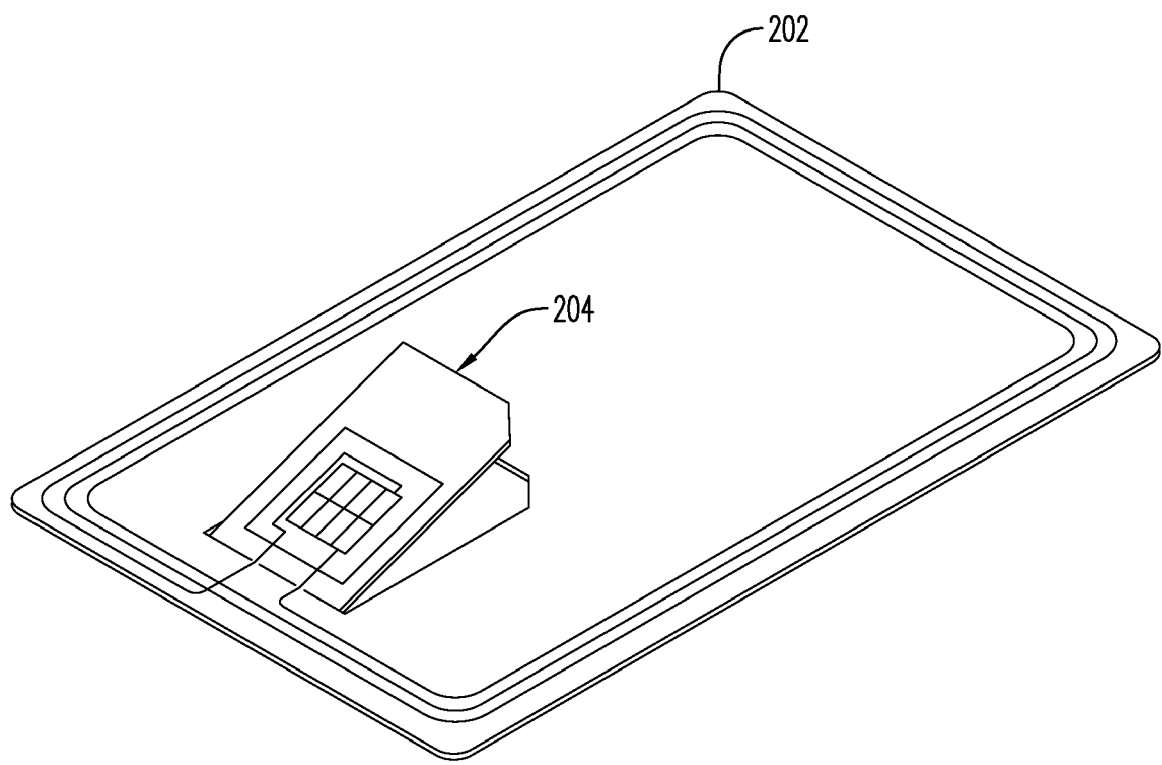
FIG. 2B is a perspective view of the structure of FIG. 2A as the small IC card is being detached from the carrier.
Figure 4A:
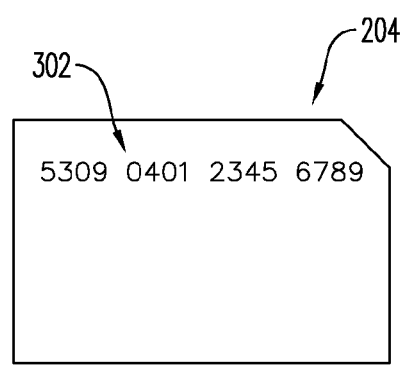
FIG. 4A is a schematic rotated bottom plan view of the small IC card after it has been removed from the carrier, in accordance with some embodiments.
Figure 4C:
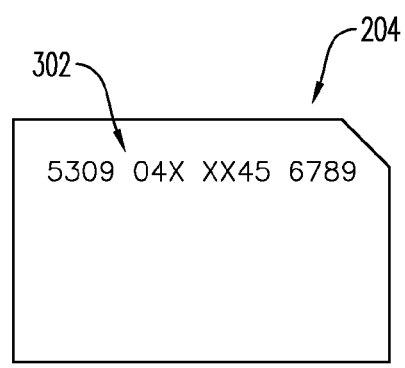
FIG. 4C is a schematic rotated bottom plan view of the small IC card after it has been removed from the carrier, in accordance with some embodiments.
Figure 4B:
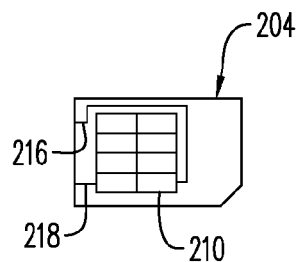
FIG. 4B is a front plan view of the small IC card after it has been removed from the carrier.

At 108 in FIG. 1, the small IC card 204 is detached from the carrier 202. For example, this may be done by the account holder, after the carrier 202, with the small IC card 204, is mailed to the account holder. The detaching of the small IC card 204 from the carrier 202 may be accomplished by snapping the small IC card 204 from the bridges 212, 214. This breaks the bridges 212, 214 and detaches the IC 210 from the antenna 208 of the carrier 202. FIG. 2B is a perspective view of the small IC card 204 and the carrier as the small IC card is being detached therefrom. FIG. 3B is a plan view of the carrier 202 in its condition after the small IC card 204 has been detached from the carrier 202. The detaching of the small IC card 204 leaves behind an aperture 312 in the carrier 202. FIG. 4A is a schematic rotated bottom plan view of the small IC card 204 after it has been detached from the carrier 202. FIG. 4B is a front plan view of the small IC card 204 after it has been detached from the carrier 202. It will be noted from both of FIGS. 3B and 4B that the connections 216, 218 between the IC 210 and the antenna 208 have been severed by the act of detaching the small IC card 204 from the carrier 202.

At 110 in FIG. 1, the small IC card 204 is installed in a device such as a wristwatch so that the device becomes a proximity payment device. The device may include an antenna to which the IC 210 is coupled by the installation of the small IC card 204 in the device. This may be done by spring-loaded or spring contacts in the device brought into contact with contact pads on the IC 210 by the process of installing the small IC card 204 in the device.

Figure 5A:
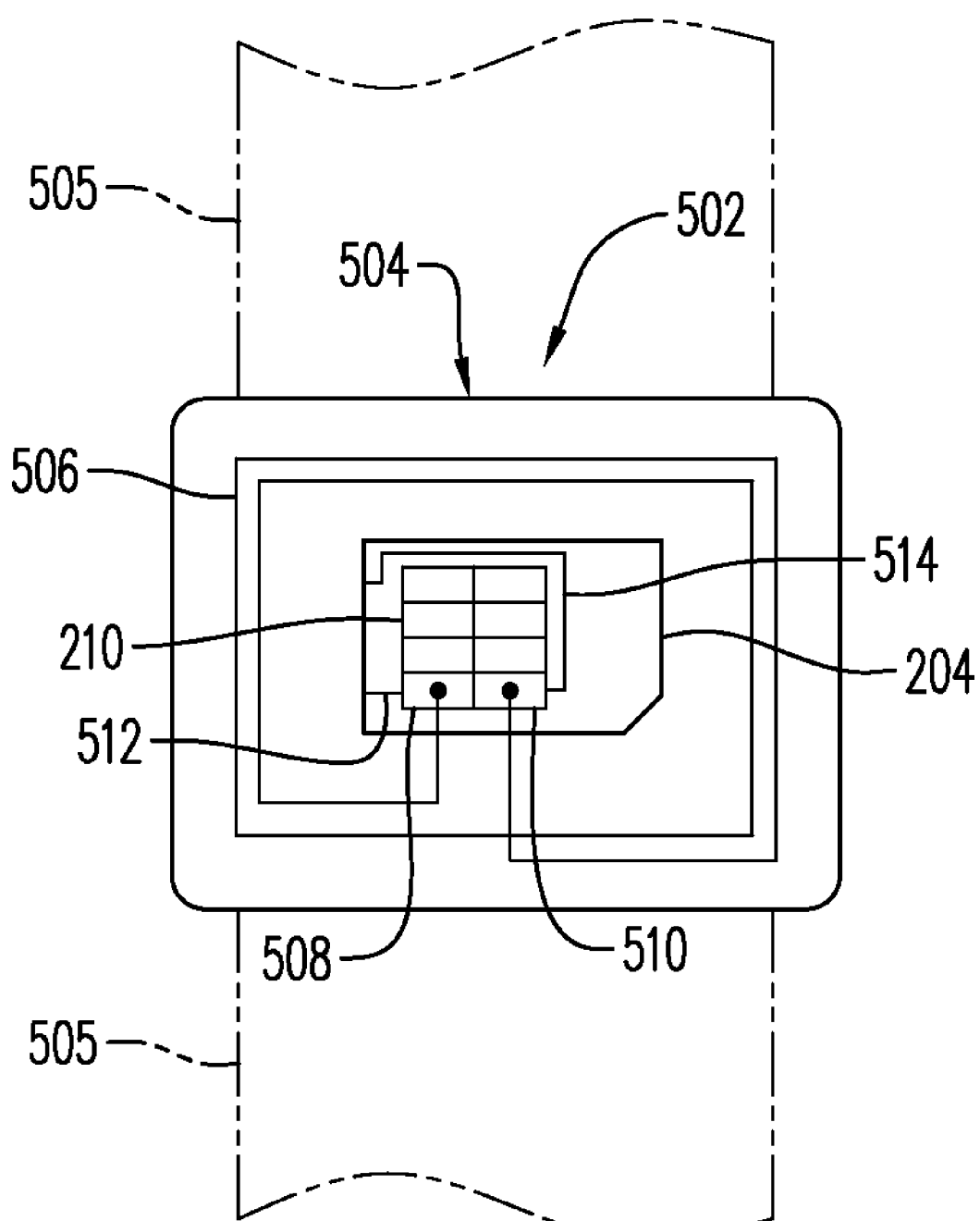
FIG. 5A is a schematic plan view of a proximity payment device in which the small IC card has been incorporated, in accordance with some embodiments.

FIG. 5A is a schematic view of a proximity payment device 502 that may be provided at step 110, in accordance with some embodiments. Reference numeral 504 indicates the body of the proximity payment device 502, with the small IC card 204 installed in the body 502. If the proximity payment device 502 is a wristwatch, the body 502 may be the case of the wristwatch, and other functional components of the wristwatch, such as a movement, a numeric liquid crystal display, a wristwatch chip, a battery, etc., may be present but are not shown in the drawing. The proximity payment device 502 may further include a wrist band 505 or the like which may be secured to the body 502. The proximity payment device 502 need not be a wristwatch but may rather be a wristband or a bracelet, or a pendant, or any other type of device.

The proximity payment device 502 also includes an antenna 506 contained in and/or supported on the body 504 of the proximity payment device 502. The antenna 506 is electrically conductively coupled to the IC 210 of the small IC card 204. The coupling of the IC 210 to the antenna 506 may be via the same contact pads 508, 510 by which the IC 210 was previously coupled to the antenna 208 of the carrier 202 (FIG. 2A). It will be observed from FIG. 5A that stubs 512, 514 of the connections to the (temporary) antenna 208 are still coupled to the contact pads 508, 510, respectively.

As shown, the antenna 506 may be in the form of several loops arranged in and/or supported on the proximity payment device 502. Alternatively, the antenna 506 may be of a different type and/or configuration. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device.

Figure 5B:
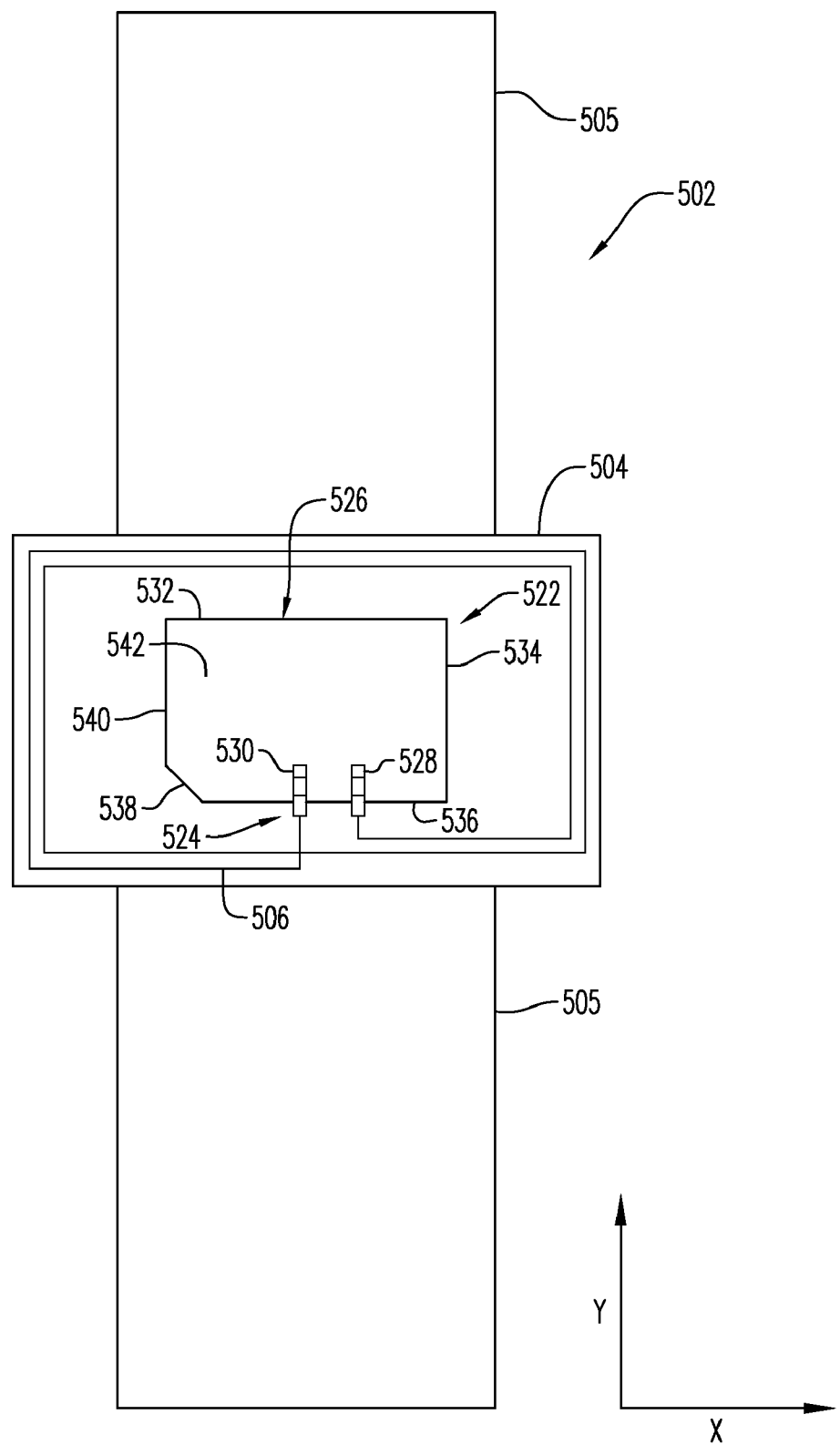
FIG. 5B is a schematic plan view of a portion of the proximity payment device of FIG. 5A, in accordance with some embodiments, prior to installing the small IC card therein.

FIG. 5B is a schematic plan view of a portion of the proximity payment device 502, in accordance with some embodiments, prior to installing the small IC card 204 therein. Referring to FIG. 5B, the proximity payment device 502 may include a holder 522 and an electrical interface 524. The holder 522 may include a seat 526 adapted to receive the small IC card 204 and to support and/or position the small IC card 204 relative to the electrical interface 524, at least in part. The electrical interface 524 may include first and second contacts 528, 530, which may be adapted to contact the contacts 508, 510, respectively, of the IC 210 of the small IC card 204. The contacts 528, 530 may also be electrically connect to the antenna 506, to thereby electrically connect the antenna 506 to the contacts 508, 510 of the IC 210 of the small IC card 204.

The seat 526 may include a plurality of surfaces 532-540, which may be adapted to abut surfaces of the small IC card 204 to support and/or position the small IC card 204 in the x and y directions, at least in part. The seat 526 may further include a surface 542 adapted to support and/or position the small IC card 204 in the z direction (i.e., perpendicular to the x and y directions) at least in part.

The contacts 528, 530 may be biased (e.g., in the z direction) so as to help insure contact with respective contacts of the IC 210 of the small IC card 204. In some embodiments, each of the contacts 528, 530 may comprise a spring contact that includes a contact and a spring integral therewith to bias the spring contact (e.g., in the z direction).

In some embodiments, the holder 522 and/or the electrical interface 524 may be disposed within the body 504 of the proximity payment device 502. In such embodiments, one or more portions of the body 504 may be movable and/or removable to access the holder 522 and/or electrical interface 524 of the proximity payment device 502.

The proximity payment device 502 may operate in a conventional manner. For example, the proximity payment device may operate in accordance with the above-mentioned "PayPass" standard. The proximity payment device 502 may be presented to a proximity coupling device (not shown) of a POS terminal (not shown) to accomplish payment for a sales transaction. The proximity coupling device may transmit an interrogation signal. The proximity payment device 502 may receive the interrogation signal via the antenna 506. The received interrogation signal may cause the IC 210 to be powered-up. For example, the IC 210 may rectify the received interrogation signal to generate a DC power level. The IC 210 may transmit a signal to the proximity coupling device in response to the interrogation signal. The IC 210 may transmit the signal (and possibly one or more additional signals) to the proximity coupling device via the antenna 506. One or more signals transmitted by the IC 210 may include a payment card account number and/or other information required for interaction with the proximity coupling device. In some embodiments, the IC 210 may transmit the payment card account number and/or other information via the antenna 506 after a handshake procedure or the like with the POs terminal. The POS terminal may then interact with a payment card system to charge the current sales transaction to the payment card account represented by the payment card account number received from the proximity payment device 502.

As stated above, the proximity payment device may be a wristwatch.

Figure 5C:
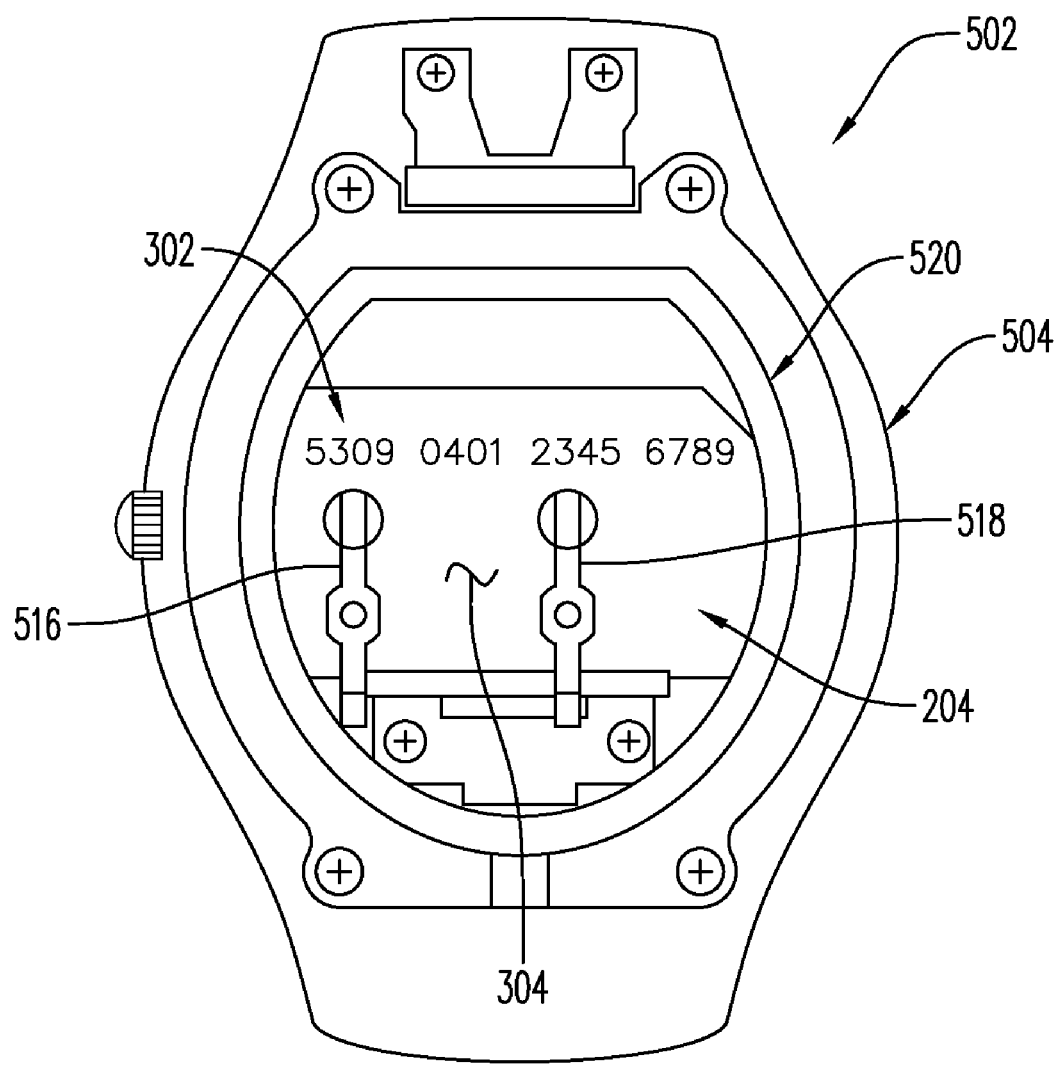
FIG. 5C is a bottom plan view of the case of a wristwatch which has had the small IC card installed therein to enable the wristwatch to function as a proximity payment device.

FIG. 5C is a bottom plan view of the case of a wristwatch 502 which has had the small IC card 204 installed therein to enable the wristwatch 502 to function as a proximity payment device. The wristwatch 502 includes a case 504 which has a transparent back 520. The small IC card 204 is installed within the case 504 of the wristwatch 502 so that substantially all of the bottom surface 304 of the small IC card 204 is visible from outside the wristwatch 502 through the transparent back 520 of the case 504. As a result, the printed payment card account number 302 for the account accessible with the small IC card 204 is visible from outside the wristwatch 502. With this feature, the account holder can readily determine or be reminded of his/her payment card account number. This may be particularly convenient if he/she wishes to use his/her account number for online ordering or to have the account number keyed in to a POS terminal to pay for a purchase transaction in cases where the POS terminal lacks a proximity coupling device or the proximity coupling device is not functioning.

The wristwatch 502 also includes an antenna (not separately shown) which is contained in and/or supported on the case 504 of the wristwatch 502. The antenna 506 is electrically conductively coupled to the IC 210 (FIG. 2A) of the small IC card 204 by connections seen at 516, 518 in FIG. 5C.

A wrist band, which is not shown, may be secured to the case 504 of the wristwatch 502 to allow the wristwatch 502 to be worn on the wrist of the account holder. The drawings (particularly FIGS. 3-5) also omit brand symbols and the like that may also be printed on the small IC card 204.

The wristwatch 502 may operate as a proximity payment device in a conventional manner. For example, the wristwatch 502 may operate in accordance with the above-mentioned "PayPass" standard. The wristwatch 502 may be presented to a proximity coupling device (not shown) of a POS terminal (not shown) to accomplish payment for a purchase transaction. For example, the account holder may place his/her wrist bearing the wristwatch 502 close to the proximity coupling device. When the wristwatch 502 is presented to the proximity coupling device, it receives and/or is powered up by an interrogation signal from the proximity coupling device. The wristwatch 502 receives the interrogation signal via its antenna (not shown). The received interrogation signal may power-up the IC 210 (FIG. 2A). Possibly after a handshake procedure or the like, the IC 210 may transmit a payment card account number to the POS terminal via the antenna. The POS terminal may then interact with a payment card system to charge the current sales transaction to the payment card account represented by the payment card account number received from the proximity payment device 502.

As an alternative to installing the small IC card in a wristwatch, the small IC card may be installed in a wristband, a bracelet, a pendant, etc. Each of such items may have a transparent front or back to allow the printed payment card account number on the small IC card to be read from outside the item in which the small IC card is installed. It will be appreciated that each of these items may include an antenna to which the IC of the small IC card may be coupled.

In some embodiments, the personalization step, at least as to storage of data in the IC of the small IC card, may be performed after the small IC card has been detached from the carrier.

In some embodiments, the back 520 of the wristwatch 502 may not be transparent. However, the printed information may nonetheless be useful in identifying the account number associated with the small IC card prior to installation in the watch 502 and/or if the back 520 of the wristwatch 502 is reopened.

In some embodiments, a user may remove the small IC card 204 from a proximity payment device 502. Such small IC card 204 may thereafter be (i) installed into another proximity payment device 502 and/or (ii) replaced by another small IC card 204, the latter of which may be installed in the proximity payment device 502.

By providing the printed payment card account number, the cardholder may be able to access his/her payment card account in a manner other than by presenting the proximity payment device for wireless reading by a POS terminal.

In some embodiments, the printed information may be useful in identifying the account number associated with the small IC card 204 before during and/or after installation of the small IC card in the wristwatch. The printed information may be useful to a manufacturer of the card, a provider or customer service representative for the account, a holder of the card and/or a merchant.

Without a human readable payment card account number information that is carried by a typical proximity payment card or other payment card, the device may be less functional than a conventional proximity payment card when the cardholder desires to access his/her payment card account in a manner other than by presenting the proximity payment device for wireless reading by a POS terminal.

The structure 200 may be fabricated in any manner.

Figure 6A:
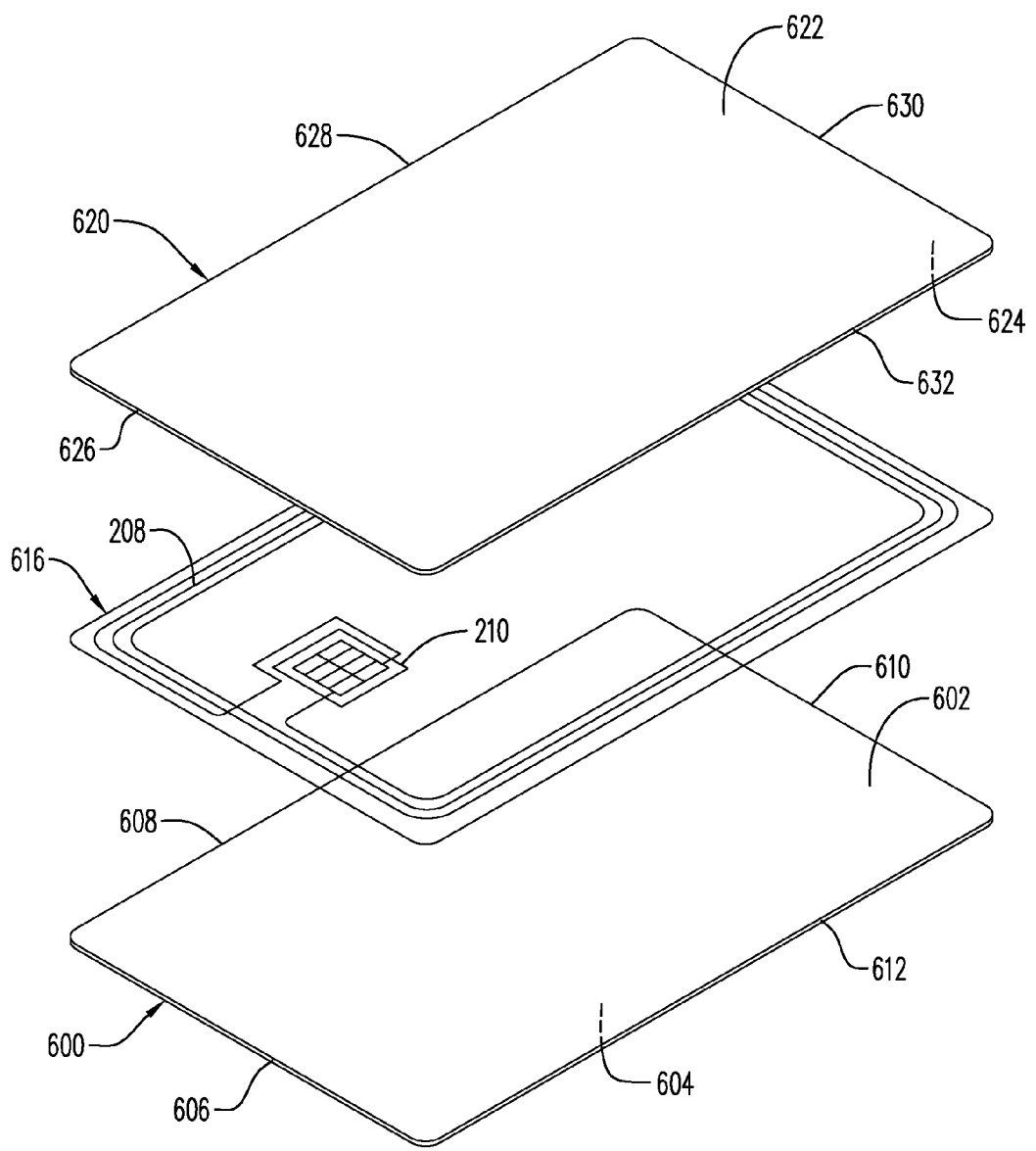
FIGS. 6A-6D show a method for fabricating the card blank and carrier of FIG. 2A, in accordance with some embodiments.

FIGS. 6A-6D show a method for fabricating the structure 200, in accordance with some embodiments. Referring to FIG. 6A, a first layer 600 may be provided. The first layer 600 may be card shaped with major outer surfaces 602, 604 and edges 606, 608, 610, 612. A central portion, indicated at 616 and sometimes referred to herein as an "inlay", may be disposed on one of the major outer surfaces 602, 604 of the first layer 600. The central portion 616 may include the antenna 208 and the IC 210. A second layer 620 may be disposed on the central portion. As with the first layer 610, the second layer 620 may be card shaped with major outer surfaces 622, 624 and outer edges 616, 618, 620, 622. The outer edges 616, 618, 620, 622 of the second layer 620 may be disposed in register with the outer edges 606, 608, 610, 612 of the first layer 600.

Figure 6B:
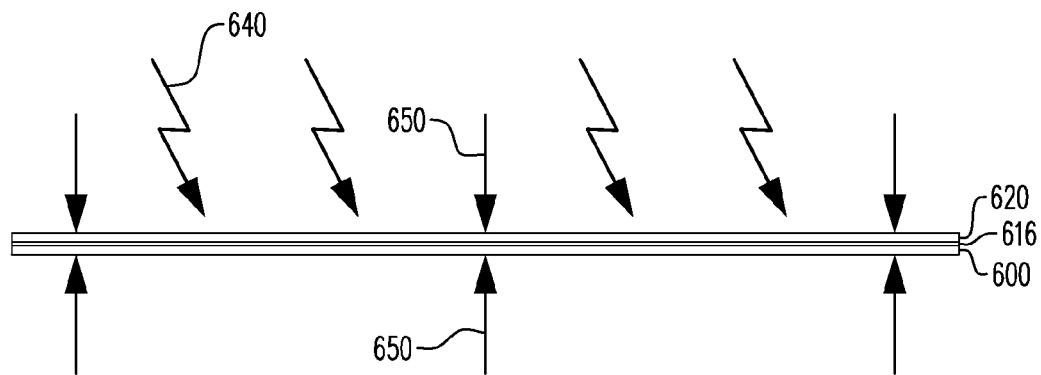

Referring to FIG. 6B, heat 640 and/or pressure 650 may be applied to the first layer 600 and/or the second layer 620. The heat 640 and/or pressure 650 may cause the first layer 600 and the second layer 620 to become bonded to one another so as to trap the antenna 208 and the IC 210 therebetween. In some embodiments, the first layer 600 and the second layer 620 are each formed of plastic or other suitable material.

Figure 6C:
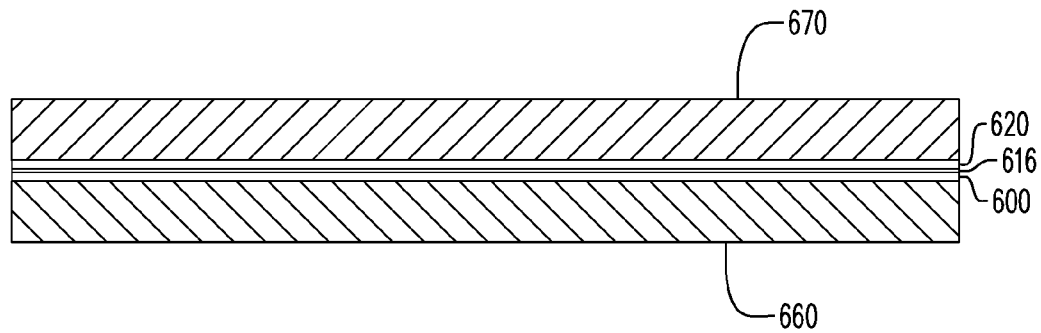

Referring to FIG. 6C, one or more platens 660, 670 may be employed to provide such heat 650 (FIG. 6C) and/or pressure 640 (FIG. 6C).

Figure 6D:
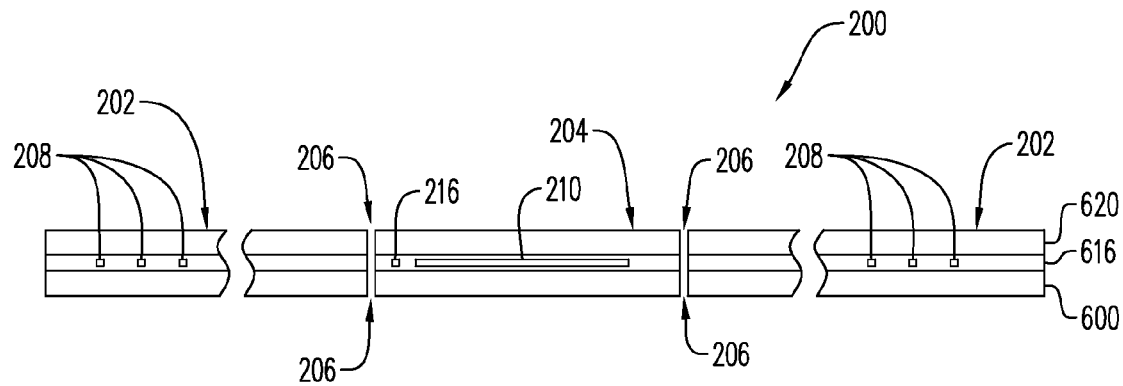

Referring to FIG. 6D, a schematic cross sectional view of one embodiment of the structure 200 taken in a direction 6D-6D of FIG. 2A, one or more portion of the first layer 600 and/or one or more portion of the second layer 620 may be removed, e.g., by punching or scoring indicated at 206 (FIG. 2A), to define the inner periphery of the carrier 202 (FIG. 2A), the outer periphery of the small IC card blank 204 (FIG. 2A) and one or more of the one or more bridges, e.g., bridges 212, 214 (FIG. 2A).

As stated above, in some embodiments, the proximity payment device 502 may be a wristwatch, a wristband, a bracelet, a pendant, etc.

Figure 7A:
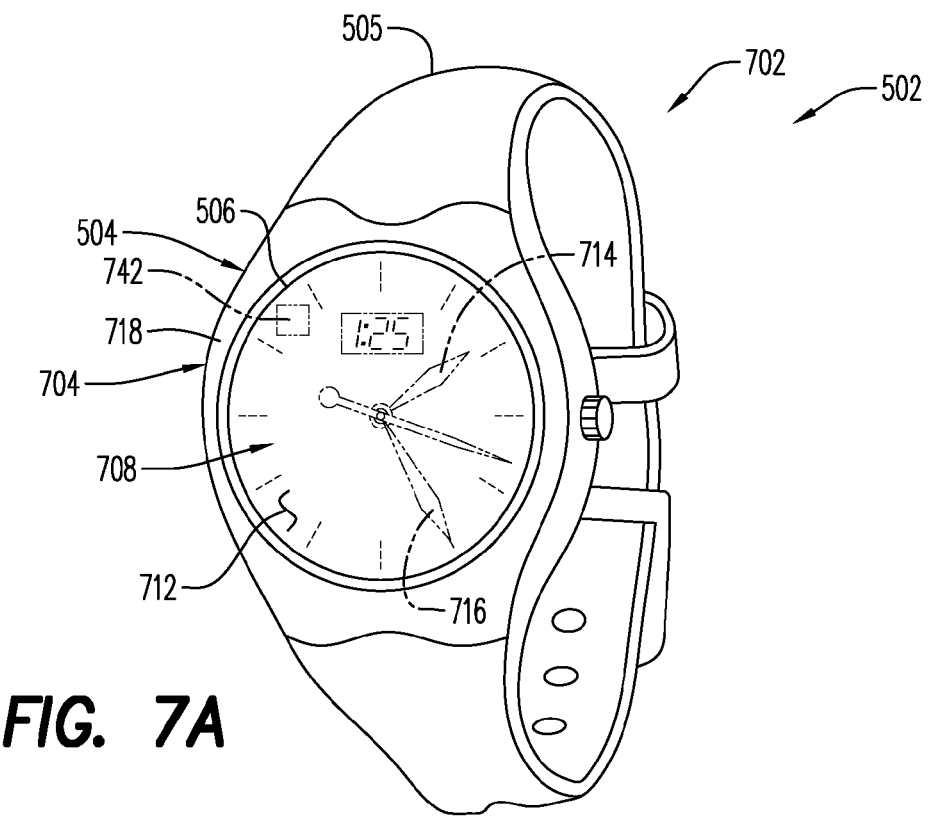
FIGS. 7A-7B are perspective views of a proximity payment device, according to some embodiments.
Figure 7B:
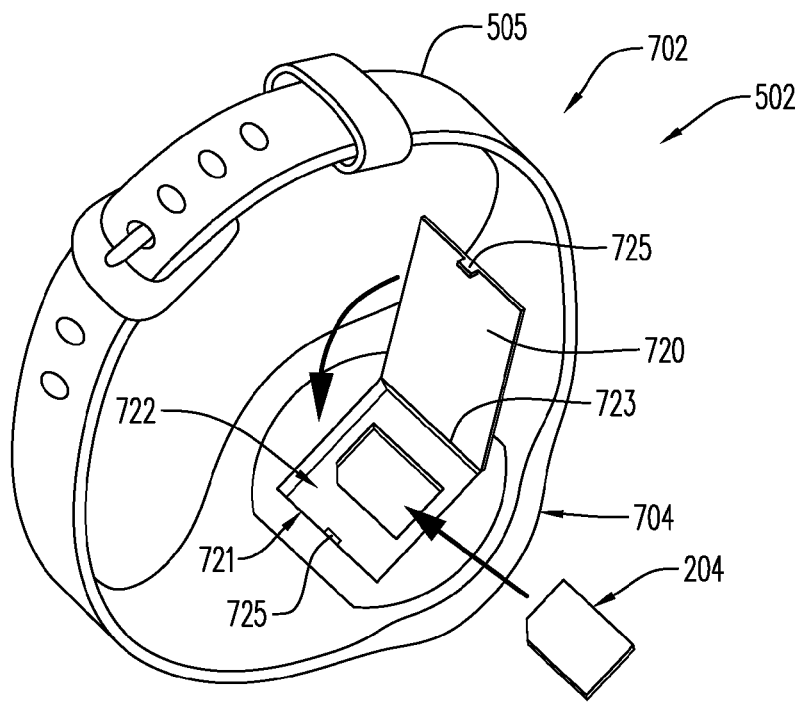

FIGS. 7A-7B are perspective views of a proximity payment device 502 that comprises a wristwatch 702, according to some embodiments. Referring to FIGS. 7A-7B, the wristwatch 702 may include a body 504 and a wristband 505 secured to the body 504. The body may define a case 704, which may enclose the antenna 506, a display 708, a power source (e.g., a power source 734 (FIG. 7F)), and/or one or more other components (e.g., a movement (not shown), a wristwatch chip (not shown), etc.) of the wristwatch 702. The display 708 may indicate time and may comprise an analog display and/or a digital display. An analog display may include a dial (or graduated face) 712 and one or more rotating members (or hands) 714, 716. A digital display may include a numerical display (e.g., a numeric liquid crystal display or numeric LED display) (not shown).

The case 704 may include one or more portions, e.g., a front portion 718 and a back portion 720. The front portion 718 may be substantially transparent to allow the display 708 to be seen therethrough. One or more portions of the case 704 may be movable relative to one or more other portions of the case 704 to allow access to an internal chamber 721 of the wristwatch 702. For example, one side of the back portion 720 may be retained by a hinge 723 and the other side of the back portion 720 may be retained by a releasable catch 725, such that upon releasing the releasable catch, one side the back portion 720 may be free to pivot away from the rest of the case 704.

Figure 7C:
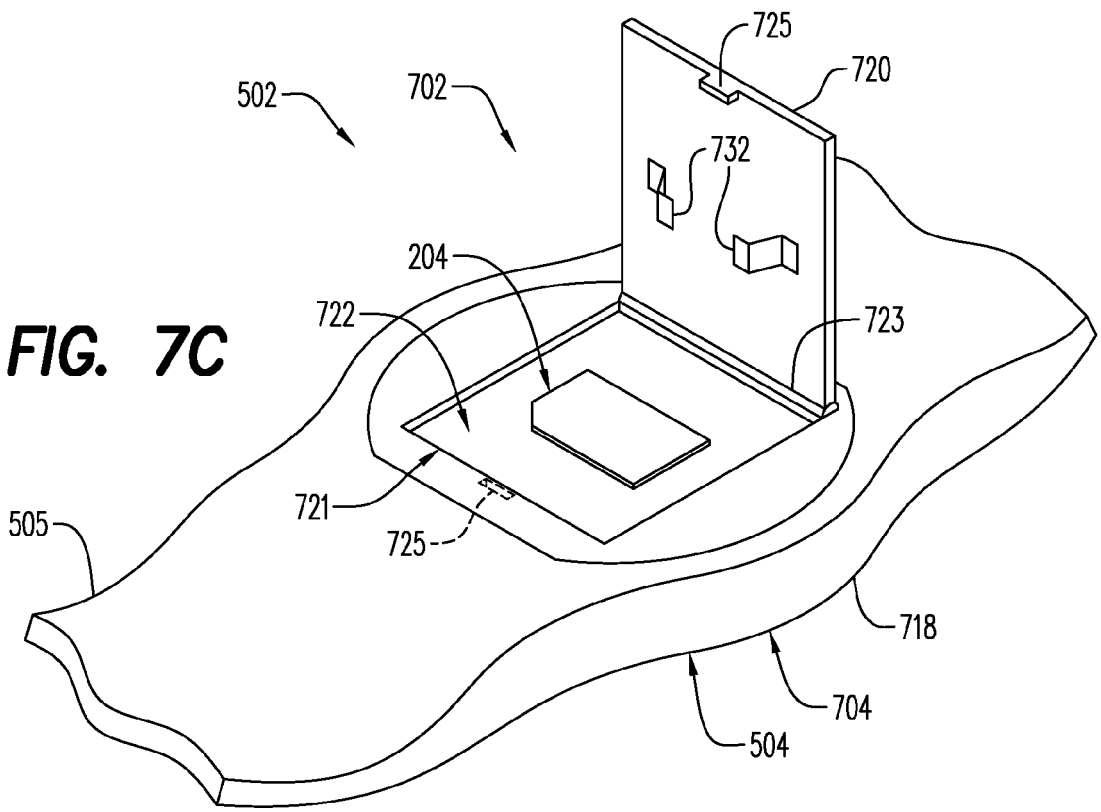
FIG. 7C is a perspective view of a portion of the proximity payment device of FIGS. 7A-7B, according to some embodiments, with a case in an open state.

FIG. 7C is a schematic, perspective view of a portion of the wristwatch 702, according to some embodiments, with the case 704 in an open state.

Figure 7D:
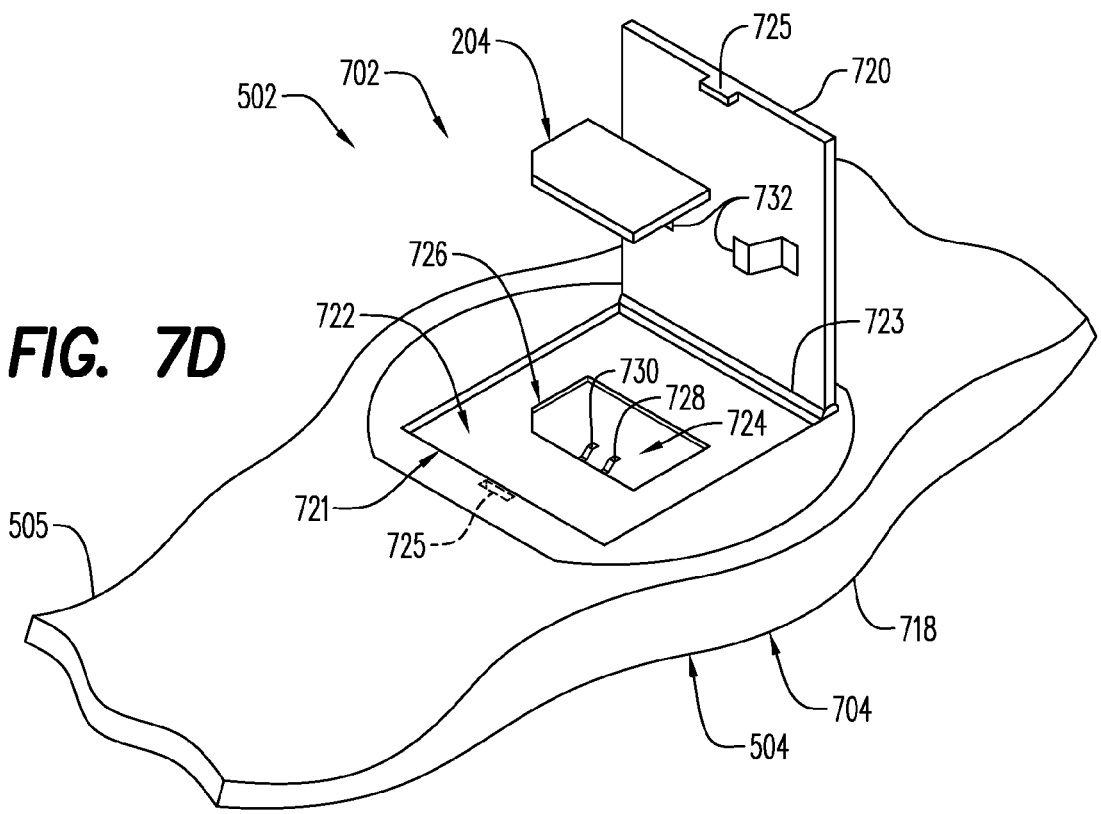
FIG. 7D is a partially exploded perspective view of the proximity payment device of FIGS. 7A-7B, according to some embodiments, with the case in an open state and the small IC card uninstalled.

FIG. 7D is a schematic, partially exploded perspective view of a portion of the wristwatch 702, according to some embodiments, with the case 704 in an open state and the small IC card 204 uninstalled.

Figure 7E:
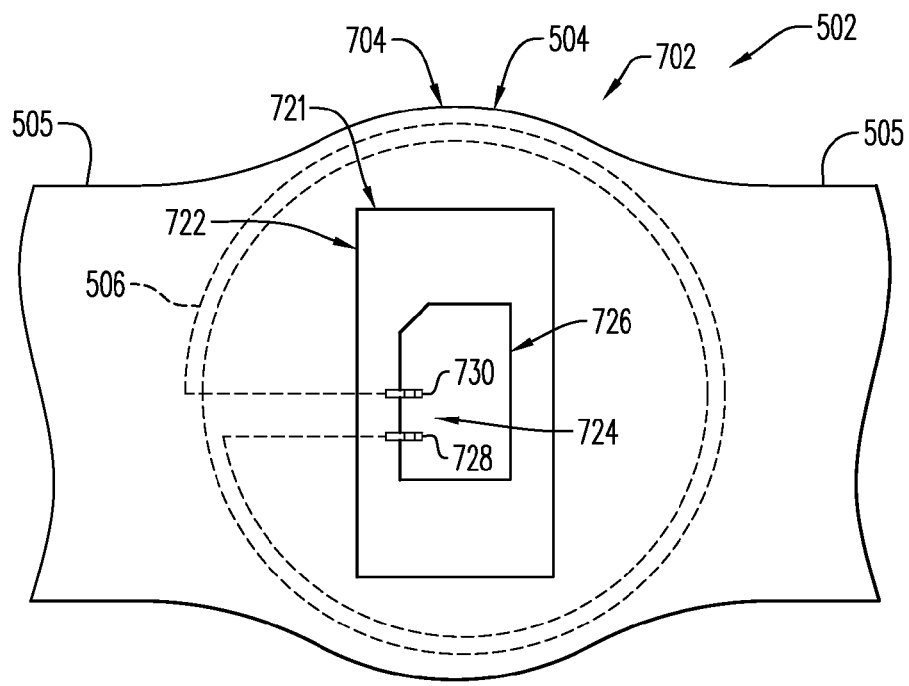
FIG. 7E is a schematic plan view of a portion of the proximity payment device of FIGS. 7A-7B, according to some embodiments, with the case removed and the small IC card uninstalled.

FIG. 7E is a schematic plan view of a portion of the wristwatch 702, according to some embodiments, with the case 704 removed and the small IC card 204 uninstalled. Referring to FIG. 7E, the wristwatch 702 may include a holder 722 and an electrical interface 724. The holder 722 may include a seat 726 adapted to receive the small IC card 204 and to support and/or position the small IC card 204 relative to the electrical interface 724, at least in part. The electrical interface 724 may include first and second contacts 728, 730, which may be adapted to contact the contacts 508, 510, respectively, of the IC 210 of the small IC card 204. The contacts 728, 730 may also electrically connect to the antenna 506, to thereby electrically connect the antenna 506 to the contacts 508, 510 of the IC 210 of the small IC card 204. The contacts 728, 730 may be biased (e.g., in the z direction) so as to help insure contact with respective contacts of the IC 210 of the small IC card 204. In some embodiments, each of the contacts 728, 730 may comprise a spring contact that includes a contact and a spring integral therewith to bias the spring contact (e.g., in the z direction). One or more springs 732 may be provided on the back portion 720 of the case 704 to bias the small IC card 204 toward the holder 722.

In some embodiments, the holder 722, the electrical interface 724, the seat 726, and contacts 728, 730 are the same as and/or similar to the holder 522, the electrical interface 524, the seat 526 and contacts 528, 530, respectively, of the proximity payment device 502 described hereinabove with respect to FIGS. 5A-5B. As stated above, in some embodiments, the proximity payment device 502 may further include a power source, e.g., a battery. The IC 210 of the small IC card 204 may be adapted to be connected to and/or receive electrical power from such power source.

Figure 7F:
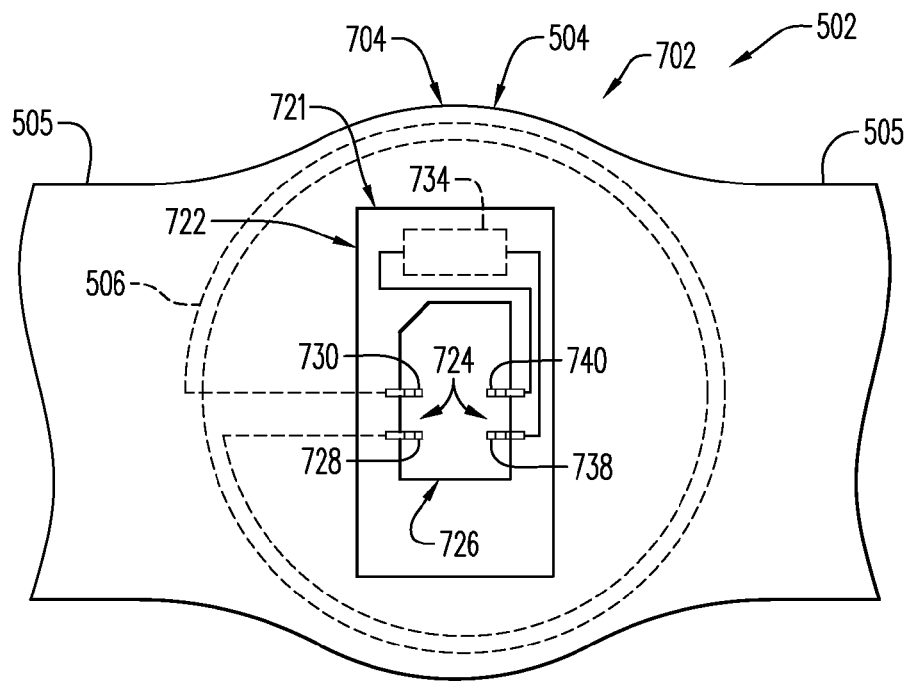
FIG. 7F is a schematic plan view of a portion of the proximity payment device of FIGS. 7A-7B, according to some embodiments, with a case removed and the small IC card uninstalled.

FIG. 7F is a schematic plan view of a portion of a wristwatch 702 that comprises a power source, e.g., a battery, 734, in accordance with some embodiments. In some embodiments, the IC 210 of the small IC card 204 may include contacts adapted to be connected to and/or receive electrical power from the power source 734. To that effect, the electrical interface 724 may further include third and fourth contacts 738, 740, which may be adapted to contact the contacts of the IC 210 of the small IC card 204 that are adapted to be connected to and/or receive electrical power from the power source 734. The contacts 738, 740 may also electrically connect to the power source 734, to thereby electrically connect the power source 734 to the contacts of the IC 210 of the small IC card 204 that are adapted to be connected to and/or receive electrical power from the power source 734. The contacts 738, 740 may be biased (e.g., in the z direction) so as to help insure contact with respective contacts of the IC 210 of the small IC card 204. In some embodiments, each of the contacts 738, 740 may comprise a spring contact that includes a contact and a spring integral therewith to bias the spring contact (e.g., in the z direction).

Access to a source of electrical power may improve one or more operating characteristics of the device. In some embodiments, access to a source of electrical power may give the proximity payment device a greater range. If the proximity device has a greater range, it may not need to be positioned as close to the proximity coupling device. In some embodiments, access to a source of electrical power may allow the device to perform a greater number of functions and/or may increase the operating speed of the device.

In some embodiments, the wristwatch 702 and/or other type of proximity payment device 502 may further include a controller. The IC 210 of the small IC card 204 may be adapted to be connected to the controller.

Figure 7G:
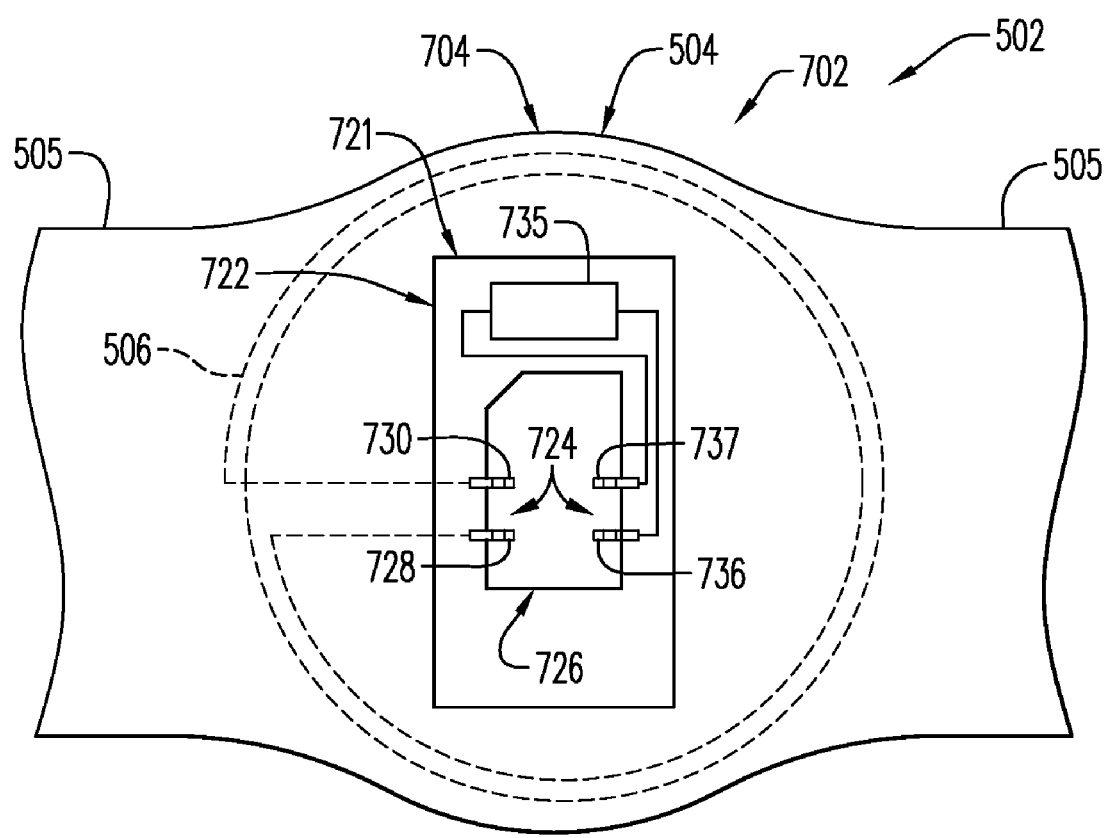
FIG. 7G is a schematic plan view of a portion of the proximity payment device of FIGS. 7A-7B, according to some embodiments, with a case removed and the small IC card uninstalled.

FIG. 7G is a schematic plan view of a portion of a wristwatch 702 that comprises a controller 735, in accordance with some embodiments. Referring to FIG. 7G, in some embodiments, the IC 210 of the small IC card 204 may include contacts adapted to be connected to the controller 735. To that effect, the electrical interface 724 may include fifth and sixth contacts 736, 737, which may be adapted to contact the contacts of the IC 210 of the small IC card 204 that are adapted to be connected to the controller 735. The contacts 736, 737 may also electrically connect to the controller 735, to thereby electrically connect the controller 735 to the contacts of the IC 210 of the small IC card 204 that are adapted to be connected thereto. In some embodiments, the controller 735 comprises a control circuit.

The contacts 736, 737 may be biased (e.g., in the z direction) so as to help insure contact with respective contacts of the IC 210 of the small IC card 204. In some embodiments, each of the contacts 736, 737 may comprise a spring contact that includes a contact and a spring integral therewith to bias the spring contact (e.g., in the z direction).

Each portion of proximity payment device 502 may comprise any type of material(s) and may have any configuration and/or construction. Thus, for example, the case 704 may comprise any type of material(s) and may have any configuration and/or construction. In some embodiments, the case may comprise a metal, ceramic, glass, plastic, fiber, silicon, semiconductor, and/or a combination thereof. Likewise, a holder 522 and/or seat 526 may have any configuration (e.g., shape and/or size) including for example, rectangular, cylindrical, elliptical, conical, irregular and/or any combination thereof. In some embodiments, the configuration may be based on the configuration of the small IC card to be received and/or any other consideration(s) or combination thereof.

In some embodiments, a wristwatch 702 and/or other type of proximity payment device 502 may be adapted to receive more than one small IC card 204. In some embodiments, a wristwatch 702 and/or other type of proximity payment device 502 may be the same as and/or similar to one or more embodiments of a wristwatch 702 and/or other type of proximity payment device disclosed in U.S. patent application Ser. No. 11/852,712, entitled "IDENTIFICATION TOKEN AND METHOD OF MAKING IDENTIFICATION TOKEN", filed in the name of Simon Phillips on even date herewith, the contents of which are hereby incorporated by reference.

In some embodiments, the small IC card 204 may be enabled at all times. In some other embodiments, the small IC card may be enabled only at selected times. In some embodiments, a wristwatch 702 or other type of proximity payment device 502 may include an input device to enable selective operation of the small IC card 204.

Figure 8A:
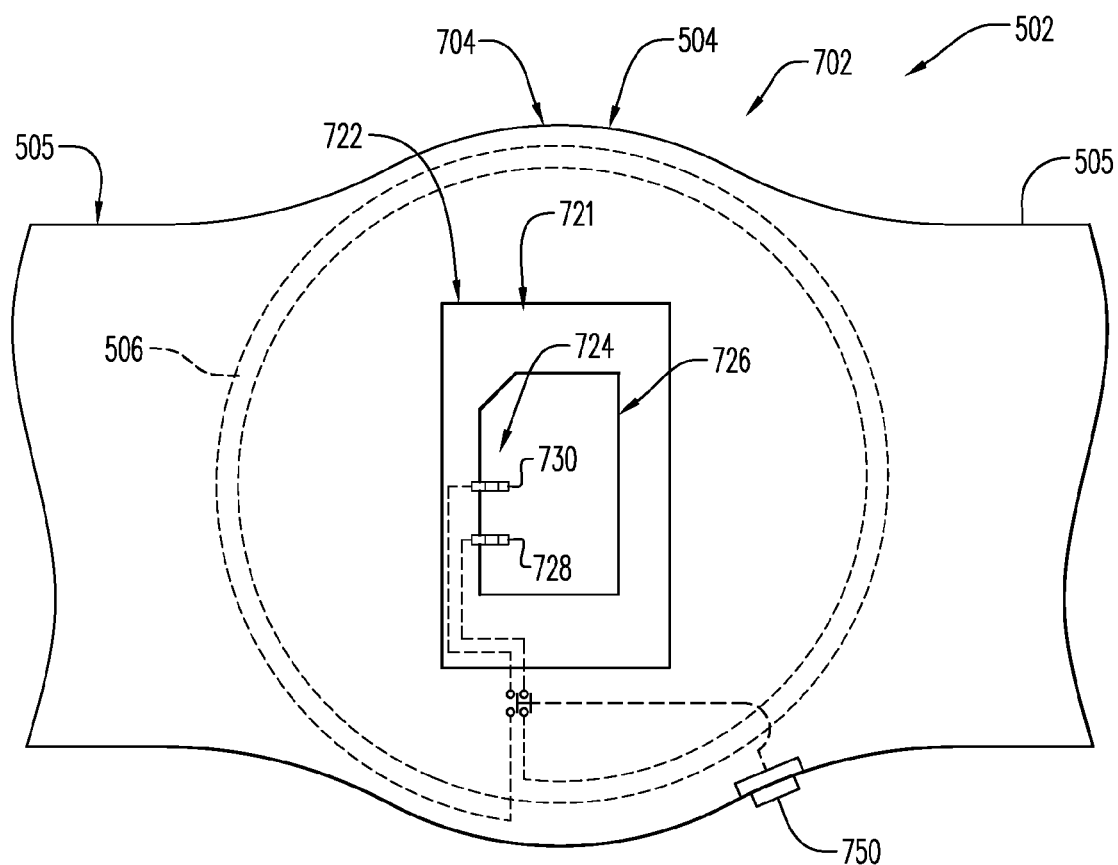
FIG. 8A is a schematic plan view of a portion of a proximity payment device, according to some embodiments, with the case removed and the small IC card uninstalled.

FIG. 8A is a schematic plan view of a portion of the wristwatch 702, according to some embodiments, with the case 704 removed and the small IC card 204 uninstalled. Referring to FIG. 8A, in accordance with some embodiments, wristwatch 702 may include an input device 750 to enable selective operation of the small IC card 204. In some embodiments, the input devices 750 may comprise a push-button switch or other type of tactile input device. Other types of input devices may also be used. The input device 750 may be disposed on the case 704 or at any other suitable location In some embodiments, the input device 750 may include a switch connected in series between the contacts 728, 730 and the antenna 506. By actuating the input device 750, the contacts 728, 730 may be electrically connected to the antenna 506 (via the switch of the input device 750) to thereby electrically connect the antenna 506 to the contacts 508, 510 of the IC 210 of the small IC card 204 and enable operation of the small IC card 204. Thus, the input device 750 may enable selective operation of the small IC card 204.

In some embodiments, the input device 750 may be electrically connected to the controller 735 but may not be electrically connected between the electrical interfaces 724A, 724B and the antenna 506. In some embodiments, a switch electrically connected between the contacts 728, 730 and the antenna 506 may be controlled by the controller 735.

Figure 8B:
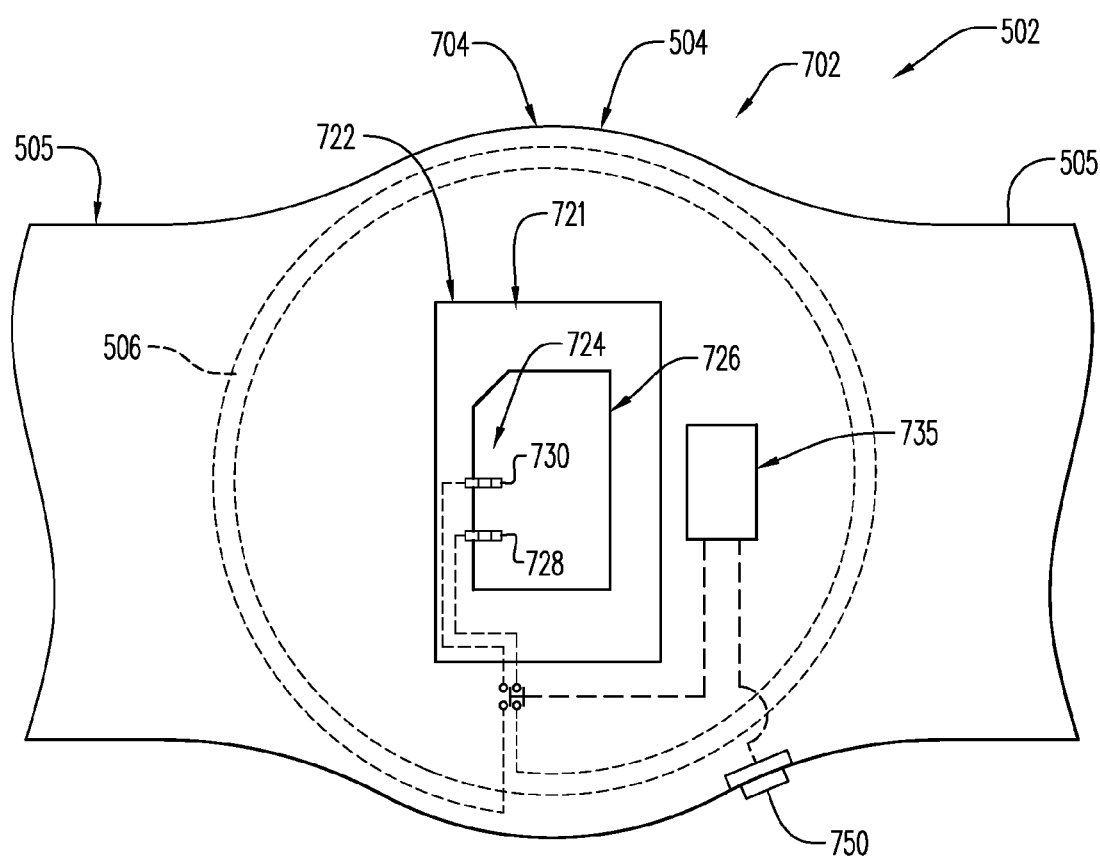
FIG. 8B is a schematic plan view of a portion of a proximity payment device, according to some embodiments, with the case removed and the small IC card uninstalled.

FIG. 8B is a schematic plan view of a portion of the wristwatch 702, according to some embodiments, with the case 704 removed and the small IC card 204 uninstalled. Referring to FIG. 8B, in accordance with some embodiments, the input device 750 may be connected to the controller 735, which may control the switches electrically between the contacts 728A, 730A, 728B, 730B and the antenna 506.

Actuating the input device 750 may cause a signal to be supplied to the controller 735, which may in turn supply a control signal that causes the switch to close. With the switch closed, the contacts 728, 730 may be electrically connected to the antenna 506 (via the switch controlled by the control circuit) to thereby electrically connect the antenna 506 to the contacts 508, 510 of the IC 210 of the small IC card 204 and enable operation of the small IC card 204. In some embodiments, the controller 735 may supply a control signal that causes the switch to open. In some embodiments, the controller 735 may supply such control signal after a predetermined delay.

In some embodiments, the controller 735 may be disposed within the proximity payment device 502. If the device 502 includes a battery, e.g., the battery 734, the controller 735 may be powered at least in part by such battery. In some embodiments, the controller 735 may include at least one control circuit and/or at least one timer circuit.

In some embodiments, the controller 735 may (i) receive information from the small IC card 204 and/or (ii) supply information in regard to the small IC card 204. In some embodiments, one or more portions of the information supplied by the controller 735 may be supplied to the display. In some embodiments, the information supplied by the controller 735 includes one or more signals that identifies the small IC card 204, indicates whether the small IC card 204 is enabled and/or how to enable the small IC card 204. In some embodiments, such information is based at least in part on information received from the small IC card 204.

The display 708 may display information based at least in part on the information supplied thereto. Thus in some embodiments, the display may display information that identifies the small IC card 204, indicates whether the small IC card 204 is enabled and/or how to enable the small IC card 204.

In some embodiments, the display 708 may define an indicator 742. In some embodiments, the indicator 742 displays information regarding the small IC card 204. In some embodiments, the indicator may provide a visual indication that may identify the small IC card 204, indicate how to enable the small IC card 204 and/or whether the small IC card 204 is enabled. In some embodiments, a visual indication may comprise a blinking indication. In some embodiments, indicator 742 may be defined by a discrete light bulb and/or a discrete light emitting diode (LED) rather than by display device 708.

In some embodiments, the information supplied to and/or by the display may define one or more logos and/or brands. In some embodiment, the one or more logos and/or brands may include (i) a brand and/or logo of a national payment card association such as MasterCard International Incorporated, (ii) a brand and/or logo of an issuer and/or merchant associated with the small IC card 204 and/or (iii) a brand and/or logo of a specific card product. In some embodiments, a brand and/or logo may comprise a mark that is registered in one or more country or jurisdiction and/or protected under trademark law in one or more country or jurisdiction.

In some embodiments, one or more portions of the information supplied to and/or by the display may comprise one or more bit map. In some embodiments, a bit map identifies the small IC card 204. In some embodiments, a bit map defines one or more logos and/or brands. In some embodiments, a bit map supplied by the controller is based at least in part on a bit map received from the small IC card 204.

In some embodiments, indicator 742 may comprise audio indicators and/or vibratory indicators in addition to and/or in lieu of indicators that provide visible indication. An audio indicator may provide an audible indication and/or a beeping audible indication. A vibratory indicator may provide a vibratory indication. In some embodiments, the indication may identify the small IC card 204, indicate how to enable the small IC card 204 and/or whether the small IC card 204 is enabled.

In some embodiments, one more springs 764 may bias the small IC card 204 away from the electrical interface 724 such that the small IC card 204 does not contact the electrical interface 724 unless the small IC card 204 is depressed, directly and/or indirectly.

Figure 8C:
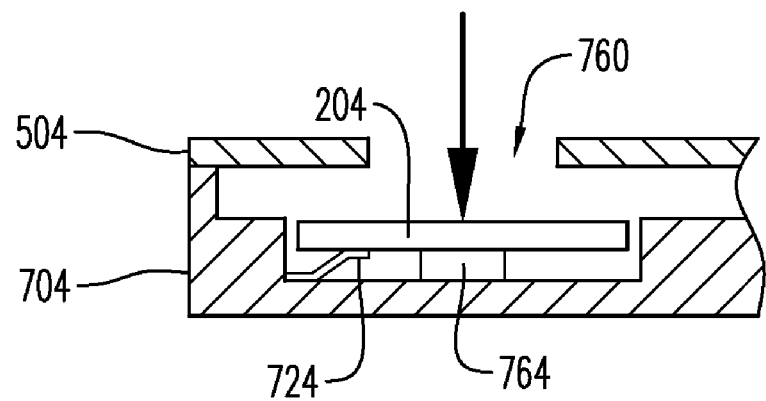
FIG. 8C is a schematic cross sectional view of a portion of a proximity payment device, according to some embodiments.
Figure 8D:
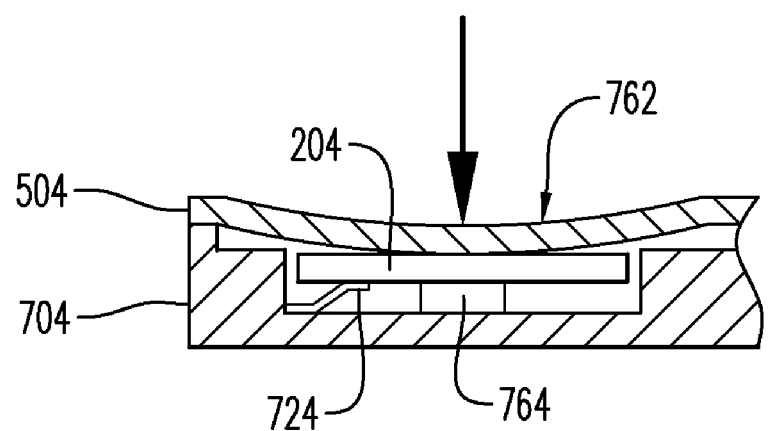
FIG. 8D is a schematic cross sectional view of a portion of a proximity payment device, according to some embodiments.

FIG. 8C-8D are schematic cross sectional views of a portion of the wristwatch 702, in accordance with some embodiments. Referring to FIGS. 8C-8D, in some embodiments, the case 704 may define one or more openings 760 and/or movable portions 762, which may be disposed in register with the small IC card 204, to allow the small IC card 204 to be depressed, directly and/or indirectly. The contacts 728, 730 of the electrical interface 724 may also electrically connect to the antenna 506. By depressing the small IC card 204, directly and/or indirectly, the contacts 728, 730 of the electrical interface may be electrically connected to the contacts 508, 510 of the IC 210 of the small IC card 204, to thereby electrically connect the antenna 506 to the contacts 508, 510 of the IC 210 of the small IC card 204 and enable operation of the small IC card 204.

In some embodiments, the switch may be connected in series between the contacts 508, 510 of the small IC card 204 and the contacts of the electrical interface 724 instead of between the contacts 728, 730 of the electrical interface 724 and the antenna 506. In some embodiments, the switch may be actuated by the input device 750. For example, the switch may be part of the input device 750. The contacts 728, 730 of the electrical interface 724 may be electrically connected to the antenna 506. By actuating the input device 750, the contacts 728, 730 may be electrically connected to the contacts 508, 510, respectively, of the IC 210 of the small IC card 204 (via the switch) to thereby electrically connect the antenna 506 to the contacts 508, 510 of the IC 210 of the small IC card 204 and enable operation of the small IC card 204.

In some embodiments, a switch connected in series between the contacts of the small IC card 204 and the contacts of the electrical interface 724 may be controlled by the controller 735 instead of the input device 750. In such embodiments, the input device 750 may be connected to the controller 735. Actuating the input device 750 may cause a signal to be supplied to the controller 735, which may in turn supply a control signal that causes the switch to close. With the switch closed, the contacts 728, 730 (which may be electrically connected to the antenna 506) may be electrically connected to the contacts 508, 510 of the IC 210 of the small IC card 204, to thereby electrically connect the antenna 506 to the contacts 508, 510 of the IC 210 of the small IC card 204 and enable operation of the small IC card 204. In some embodiments, the controller 735 may supply a control signal that causes the switch to open. In some embodiments, the controller 735 may supply such control signal after a predetermined delay.

In some embodiments, the small IC card 204 may be enabled and/or disabled in accordance with one or more methods disclosed in U.S. patent application Ser. No. 11/852, 763, entitled "ENABLING IDENTIFICATION TOKEN FOR A TIMED PERIOD", filed in the name of Simon Phillips on even date herewith, the contents of which are hereby incorporated by reference.

In some embodiments, the input device, the switch and/or the controller may be the same as and/or similar to one or more of the devices, switches and/or circuits disclosed in U.S. patent application Ser. No. 11/852,763, entitled "ENABLING IDENTIFICATION TOKEN FOR A TIMED PERIOD", filed in the name of Simon Phillips on even date herewith, the contents of which are hereby incorporated by reference.

Some embodiments may use one or more of the techniques disclosed in U.S. patent application Ser. No. 11/852,804, entitled "METHOD FOR USE IN ASSOCIATION WITH IDENTIFICATION TOKEN AND APPARATUS INCLUDING IDENTIFICATION TOKEN", filed in the name of Simon Phillips et al. on even date herewith, the contents of which are hereby incorporated by reference.

In some embodiments, printed information may be provided by the proximity payment device 502. In some embodiments, printed information includes an indication of a location of a switch and/or other type of input device. Thus the indication may indicate to the cardholder (the user) where the user should press with his/her finger to actuate a switch. In some embodiments, the indication may be provided on the body of the proximity payment device. If the body defines a case the indication may be provided on such case. If the proximity payment device includes a display, the indication may be provided on the display. In some embodiments, the indication may be provided on the small IC card 204. In some embodiments, the card may include information thereon and a back portion of the case and/or another portion of the case may be transparent and/or open to allow the information to be read.

In some embodiments, the small IC card may include an antenna.

As stated above, in some embodiments, the proximity payment device 502 may be a wristband, a bracelet, a pendant, etc.

Figure 9A:
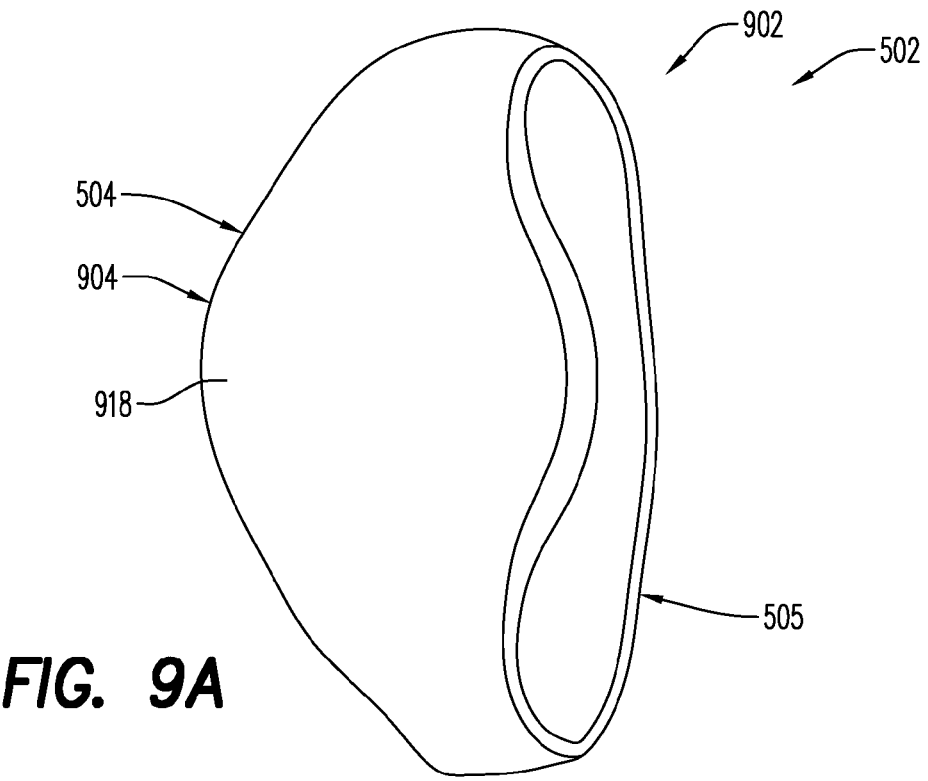
FIGS. 9A-9B are perspective views of a proximity payment device, according to some embodiments.
Figure 9B:
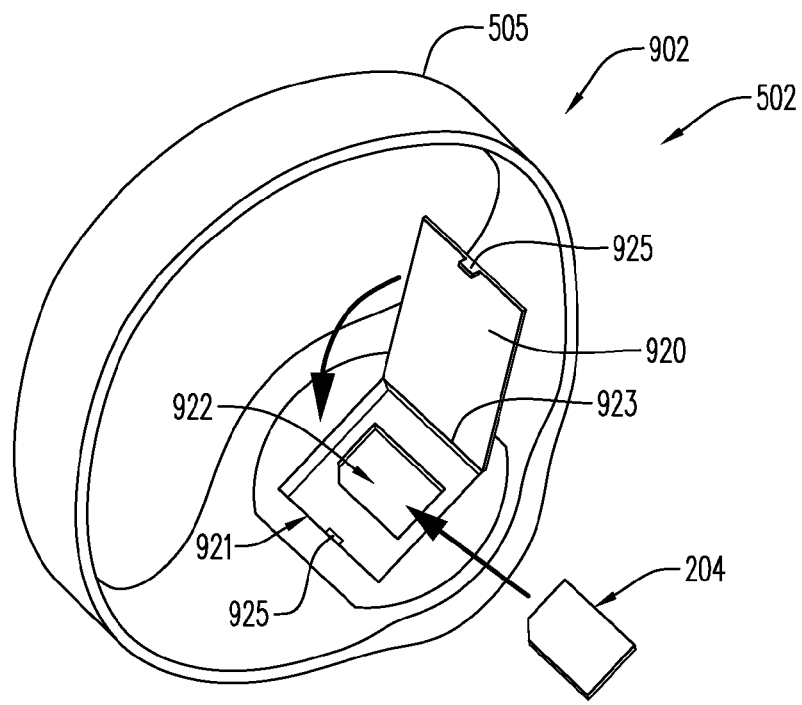

FIGS. 9A-9B are perspective views of a proximity payment device 502 that comprises a wristband 902, according to some embodiments. Referring to FIGS. 9A-9B, the wristband 902 may include a body 504 and a wristband 505 secured to the body 504. The body may define a case 904, which may enclose the antenna 506 and/or one or more other components of the proximity payment device.

The case 904 may include one or more portions, e.g., a front portion 918 and a back portion 920. One or more portions of the case 904 may be movable relative to one or more other portions of the case 904 to allow access to an internal chamber 921 of the wristband 902. For example, one side of the back portion 920 may be retained by a hinge 923 and the other side of the back portion 920 may be retained by a releasable catch 925, such that upon releasing the releasable catch, one side the back portion 920 may be free to pivot away from the rest of the case 904.

The wristband 902 may include a holder 922 and an electrical interface 924, which may be the same as and/or similar to (i) the holder 522 and the electrical interface 524, respectively, of the proximity payment device 502 described hereinabove with respect to FIGS. 5A-5B and/or (ii) the holder 722 and the electrical interface 724, respectively, of the proximity payment device 502 described hereinabove with respect to FIGS. 7A-7G.

The wristband 902 may include a display, a battery and/or a controller. In some embodiments, the display may be the same and/or similar to the display 708 of the proximity payment device 502 described hereinabove with respect to any one or more of FIGS. 7A-7F, 8A-8D. In some embodiments, the battery may be the same and/or similar to the battery 734 of the proximity payment device 502 described hereinabove with respect to any one or more of FIGS. 7A-7F, 8A-8D. In some embodiments, the controller may be same and/or similar to the controller 735 of the proximity payment device 502 described hereinabove with respect to any one or more of FIGS. 7A-7F, 8A-8D.

Figure 10A:
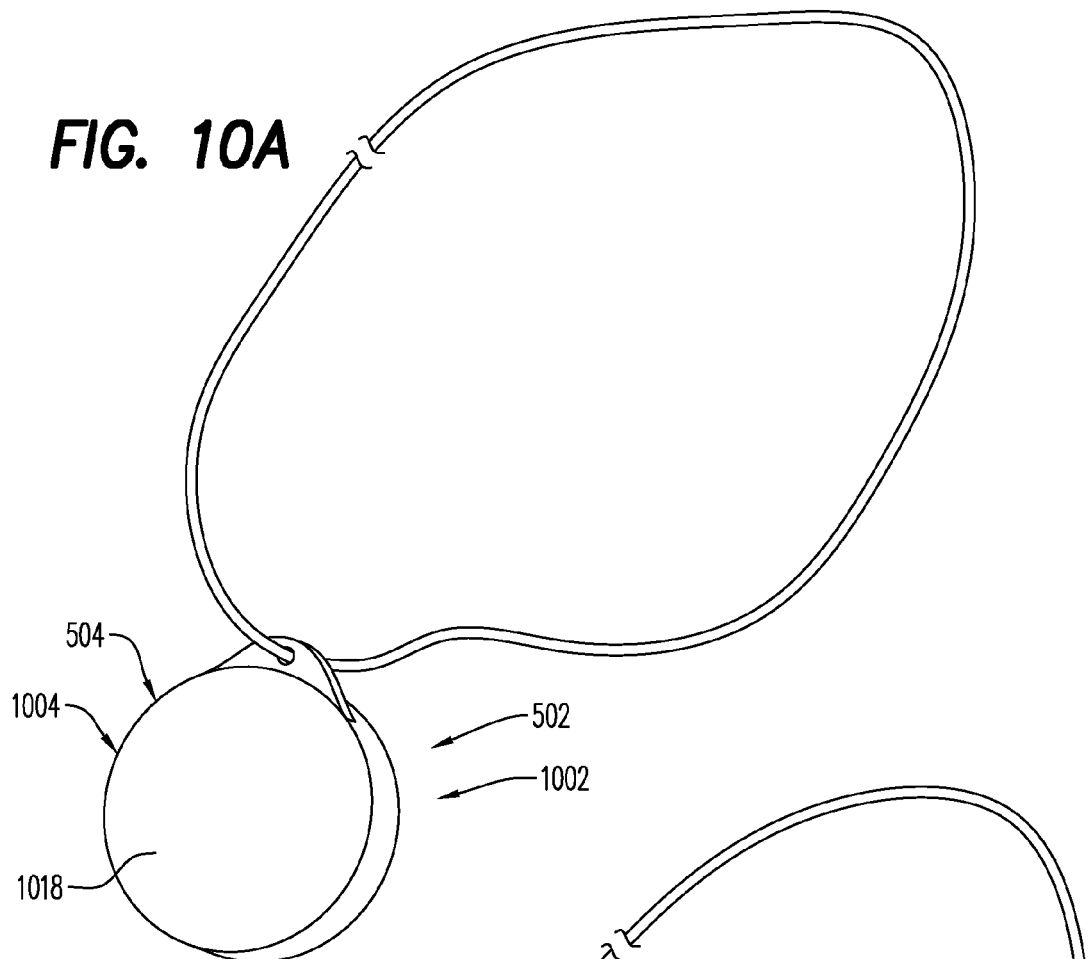
FIGS. 10A-10B are perspective views of a proximity payment device, according to some embodiments.
Figure 10B:
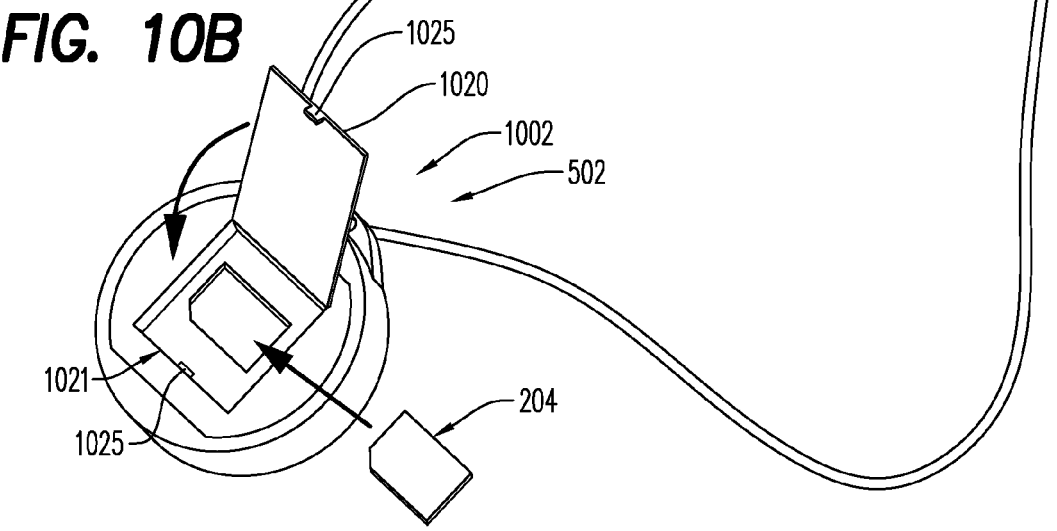

FIGS. 10A-10B are perspective views of a proximity payment device 502 that comprises a pendant 1002, according to some embodiments. Referring to FIGS. 10A-10B, the pendant 1002 may include a body 504 and a band 505 secured to the body 504. The body may define a case 1004, which may enclose the antenna 506 and/or one or more other components of the proximity payment device.

The case 1004 may include one or more portions, e.g., a front portion 1018 and a back portion 1020. One or more portions of the case 1004 may be movable relative to one or more other portions of the case 1004 to allow access to an internal chamber 1021 of the wristband 1002. For example, one side of the back portion 1020 may be retained by a hinge 1023 and the other side of the back portion 1020 may be retained by a releasable catch 1025, such that upon releasing the releasable catch, one side the back portion 1020 may be free to pivot away from the rest of the case 1004.

The pendant 1002 may include a holder 1022 and an electrical interface 1024, which may be the same as and/or similar to (i) the holder 522 and the electrical interface 524, respectively, of the proximity payment device 502 described hereinabove with respect to FIGS. 5A-5B and/or (ii) the holder 722 and the electrical interface 724, respectively, of the proximity payment device 502 described hereinabove with respect to FIGS. 7A-7G.

The pendant 1002 may include a display, a battery and/or a controller. In some embodiments, the display may be the same and/or similar to the display 708 of the proximity payment device 502 described hereinabove with respect to any one or more of FIGS. 7A-7F, 8A-8D. In some embodiments, the battery may be the same and/or similar to the battery 734 of the proximity payment device 502 described hereinabove with respect to any one or more of FIGS. 7A-7F, 8A-8D. In some embodiments, the controller may be same and/or similar to the controller 735 of the proximity payment device 502 described hereinabove with respect to any one or more of FIGS. 7A-7F, 8A-8D.

In some embodiments, the device 502 may not have, and/or may not be used with, a wristband, a neckband, and/or any other type of band.

Figure 11A:
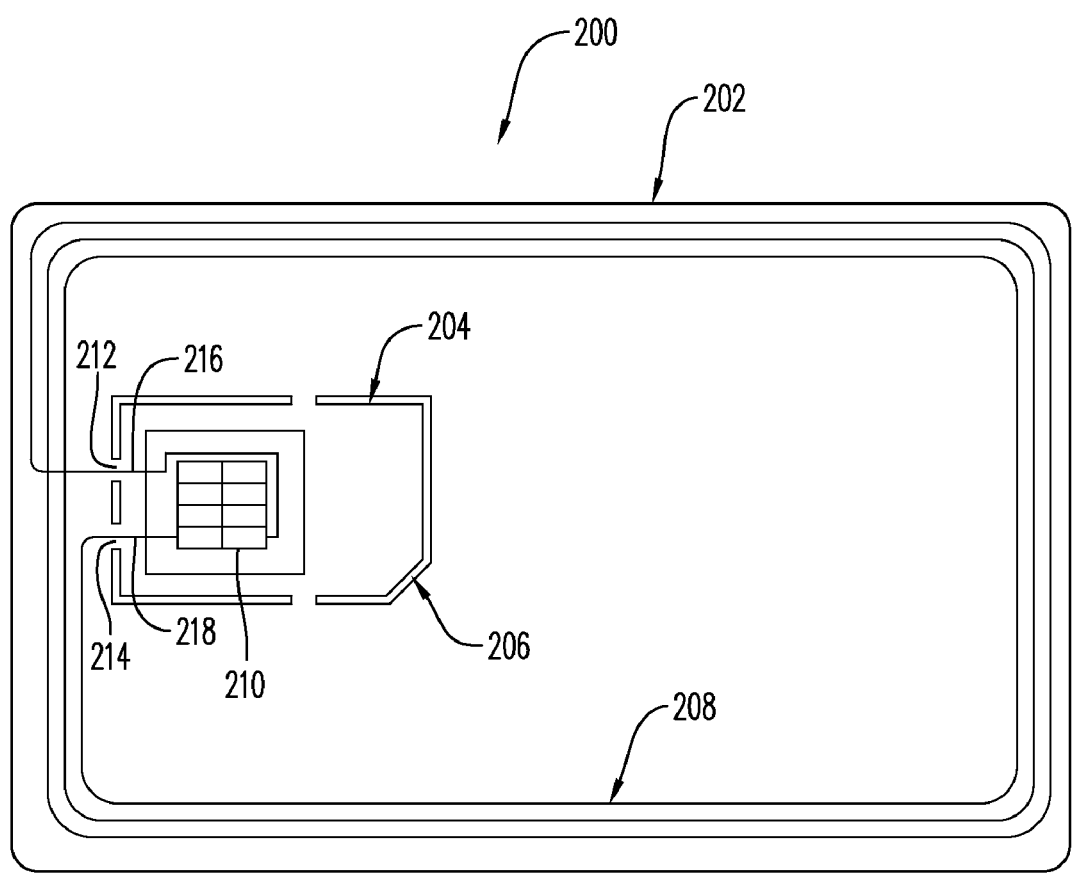
FIG. 11A is a plan view of a structure that includes a small IC card blank and a larger carrier for the small IC card blank, in accordance with some embodiments.

FIG. 11A is a plan view of a structure 200 that includes a small IC card blank and a larger carrier for the small IC card blank, in accordance with some embodiments. Referring to FIG. 11A, in accordance with some embodiments, the structure 200 may be similar to the structure 200 described above with respect to FIG. 2A. The body of the small IC card 204 may be joined to the body of the carrier 202 by bridges at the periphery of the body of the small IC card 204. Four bridges are shown although others may be present. The bridges may be formed as locations around the periphery of the small IC card 204 at which the scoring or punching has not occurred.

Figure 11B:
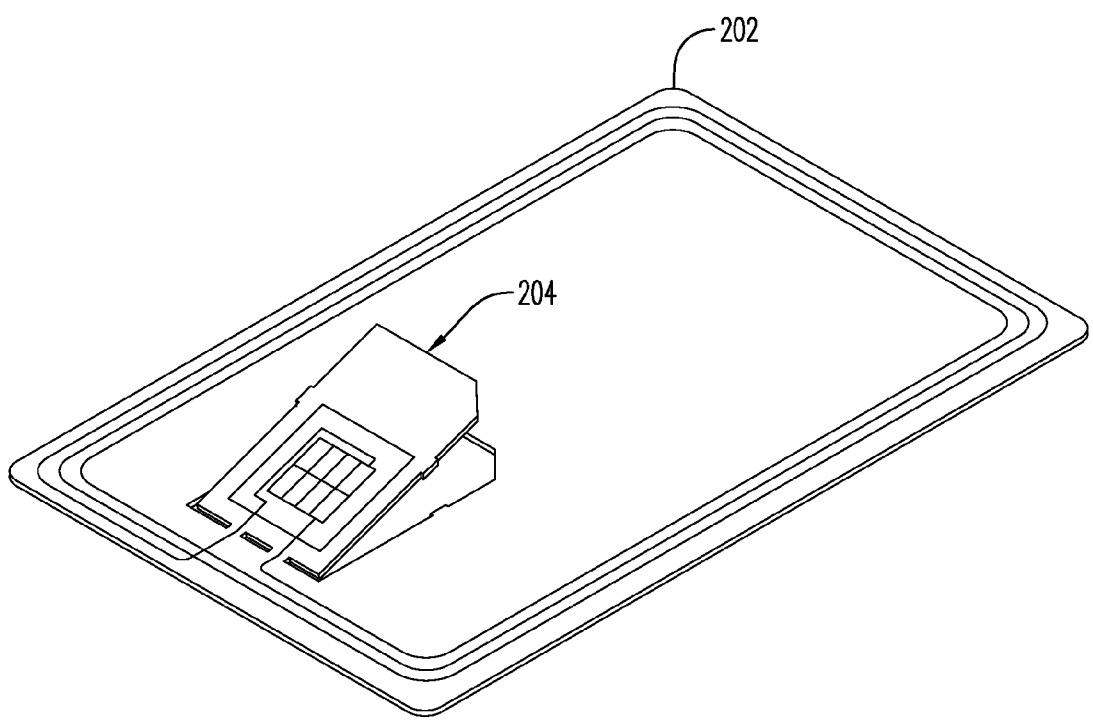
FIG. 11B is a perspective view of the structure of FIG. 11A as the small IC card is being detached from the carrier.

FIG. 11B is a perspective view of the structure of FIG. 11A as the small IC card is being detached from the carrier.

Figure 12:
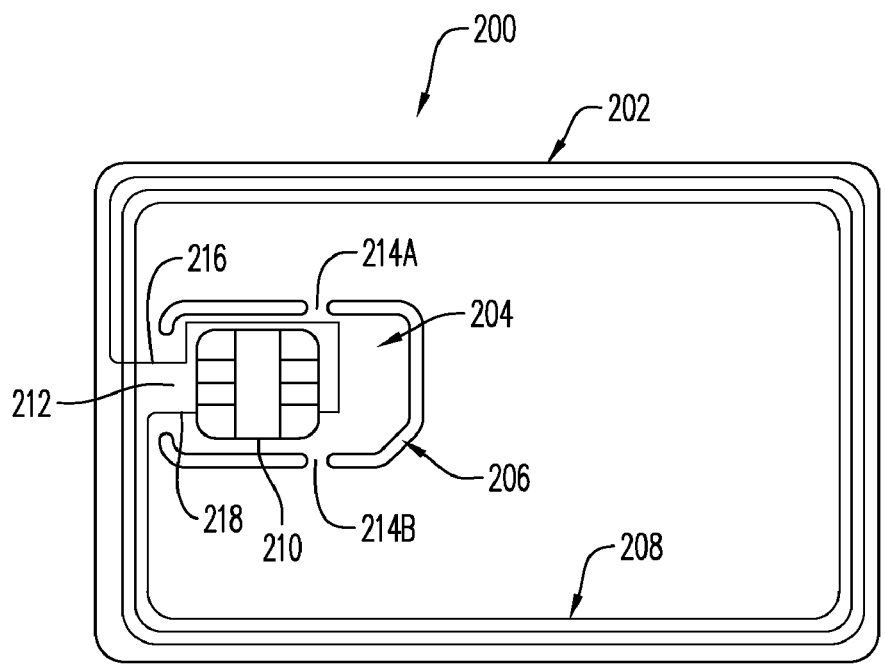
FIG. 12 is a plan view of a structure that includes a small IC card blank and a larger carrier for the small IC card blank, in accordance with some embodiments.

FIG. 12 is a plan view of a structure 200 that includes a small IC card blank and a larger carrier for the small IC card blank, in accordance with some embodiments. Referring to FIG. 12, in accordance with some embodiments, the structure 200 may be similar to the structure 200 described above with respect to FIG. 2A. The body of the small IC card 204 may be joined to the body of the carrier 202 by bridges at the periphery of the body of the small IC card 204. Three bridges 212, 214A, 214B are shown although others may be present. The bridges may be formed as locations around the periphery of the small IC card 204 at which the scoring or punching has not occurred.

Figure 13:
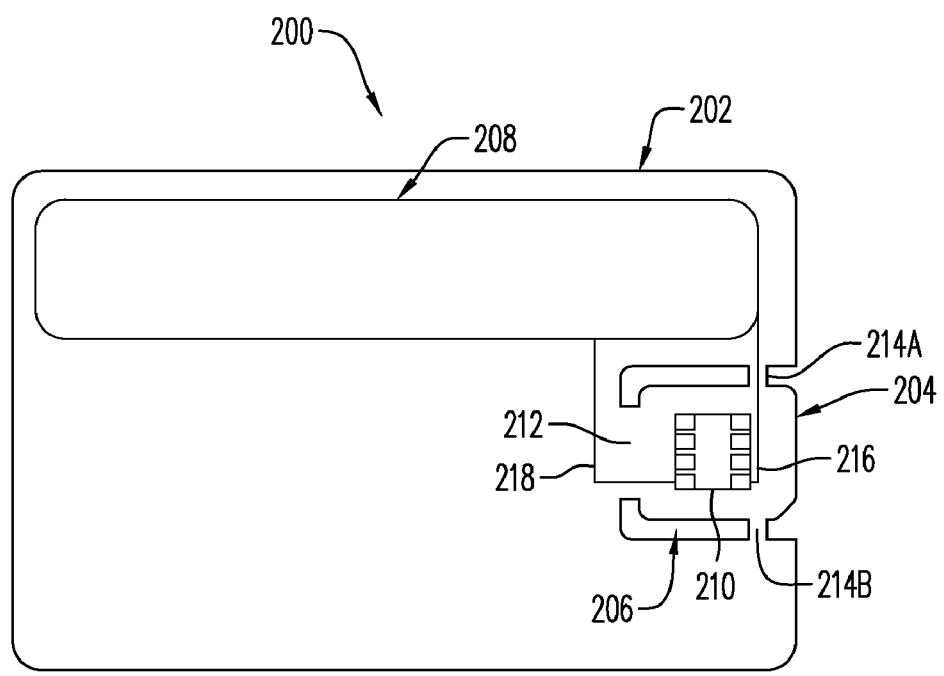
FIG. 13 is a plan view of a structure that includes a small IC card blank and a larger carrier for the small IC card blank, in accordance with some embodiments.

FIG. 13 is a plan view of a structure 200 that includes a small IC card blank and a larger carrier for the small IC card blank, in accordance with some embodiments. Referring to FIG. 12, in accordance with some embodiments, the structure 200 may be similar to the structure 200 described above with respect to FIG. 2A. The small IC card 204 may have dimensions as defined for the standard card/module referred to as "ID000" in the document no. 7810 promulgated by the International Standardization Organization and other bodies. The body of the small IC card 204 may be joined to the body of the carrier 202 by bridges at the periphery of the body of the small IC card 204. Three bridges 212, 214A, 214B are shown although others may be present. The bridges may be formed as locations around the periphery of the small IC card 204 at which the scoring or punching has not occurred.

In some embodiments, use of a small card having dimensions of an "ID0000"card/module, which is smaller than a "ID000"card/module, may allow the small IC card 204 to be positioned at a location away from a vacuum cup and/or other suction devices that may be employed in programming equipment, such as the model 9000 available from Datacard Group, Minnetonka, Minn., which may be used to program the small IC card 204.

In some embodiments one or more of the circuits of the proximity payment device may include an enable line that may be used to enable and/or disable the proximity payment device. In some embodiments, methods in addition to and/or in lieu of those described herein may be employed to enable and/or disable the proximity payment device.

One or more of the proximity payment devices may also have a contact interface like that of a conventional smart card that includes a contact interface.

Although back portions 720, 920 and 1020 are not shown as being transparent, in some embodiments, any or all of such back portions 720, 920 and 1020 may be transparent.

Although information is not shown printed on some small IC cards 204 in some embodiments any or all of such small IC cards 204 may have information printed thereon.

Pursuant to some embodiments, the small IC card 204 is personalized with a payment card account number (otherwise referred to as a "primary account number" or "PAN") that directly identifies a payment card account. In some embodiments, the small IC card 204 is personalized with a proxy or surrogate account number that does not, on its own, directly identify a payment card account. Instead, the proxy or surrogate account number (otherwise referred to, in the context of a MasterCard-branded payment card, as a "PayPass PAN" or "PPAN") is translated into a PAN (e.g., during a payment transaction by a payment network or an issuer) for use in completing a transaction. Pursuant to some embodiments, the portion of the payment card account number printed on the small IC card (or displayed on a device such as a watch) is based on the PAN.

As used herein and in the appended claims, "proximity payment device" refers to any device, of any shape, which transmits to a point of sale terminal, by wireless transmission, a payment account number. As used herein and in the appended claims, a payment account number may be numeric, non numeric and/or a combination thereof.

The principles taught herein have heretofore been described in the context of proximity payment devices. Nevertheless, these teachings are also applicable to any type of identification token. As used herein and in the appended claims the term "identification token" refers to a device, of any shape, that serves as one or more of a proximity payment device, a transportation related device, an identification device, an RFID-enabled passport and/or a source of any type of information associated with a holder of the identification token (and/or the holder of the card installed therein). The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information. As used herein, an account number may be numeric, non numeric and/or a combination thereof.

Notably, the size of the IC card compared to the rest of the structure may be different than shown. In some embodiments, the IC card may be the same size as the rest of the structure to which it is attached or even larger than the rest of the structure to which it is attached.

As used herein, the term surrounding includes both completely surrounding and partially surrounding. Thus, a surrounding card may be a completely surrounding card and/or a partially surrounding card.

Thus, in accordance with some embodiments, information other than a payment card account number (or portion thereof) that was (or is to be) stored in the IC 210 may be printed on a surface of the small IC card 204. In some embodiments, the printing may be by use of the above-mentioned Datacard 9000 equipment or by another suitable device with printing capabilities. In some embodiments, the printed information may comprise one or more portions of a name, a social security number, an account number, an expiration date, a security code and/or medical information.

If a device comprises more than one identification token, zero, one or more of such identification tokens may comprise a proximity payment device.

The above description and/or the accompanying drawings are not meant to imply a fixed order or sequence of steps for any process referred to herein; rather any process may be performed in any order that is practicable, including but not limited to simultaneous performance of steps indicated as sequential.

The proximity payment cards described herein may be considered to be a sort of contactless smart card. The teachings of this application are thus applicable to contactless smart cards generally, as well as to so-called "dual interface" smart cards, which contain a set of contacts on a surface of the card to allow for direct contact interface to a terminal. "Dual interface" smart cards also include an antenna to allow for interfacing to a terminal by wireless transmission of signals.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
providing an integrated circuit (IC) card having a first size and carried as part of a surrounding card having a second size larger than the first size, the IC card including an IC, the IC card having a perimeter defining the IC card within the surrounding card, the IC card having a memory for storing a payment account number therein, said payment account number transmitted to said IC card for storage using wireless transmission; and
printing said payment card account number on a visible surface of said IC card within the perimeter.

2. The method of claim 1, further comprising:
snapping the IC card out of the surrounding card.

3. The method of claim 2, further comprising:
installing the IC card in a wristwatch, wristband or bracelet.

4. A method comprising:
providing an integrated circuit (IC) card attached to a surrounding card, the IC card including an IC, the IC card having a perimeter defining the IC card within the surrounding card and a memory, the memory storing an electronic representation of a payment account number, the payment account number transmitted to the IC card for storage using a wireless transmission; and printing a human readable representation of the payment account number on a surface of the IC card and within the perimeter.

5. The method of claim 4, further comprising:
snapping the IC card out of the surrounding card.

6. The method of claim 5, further comprising:
installing the IC card in a wristwatch, wristband or bracelet.

* * * * *